United States Patent
Purohit et al.

(10) Patent No.: US 10,191,674 B2
(45) Date of Patent: Jan. 29, 2019

(54) SHARED DENSE TREE REPAIR

(71) Applicant: NetApp, Inc., Sunnyvale, CA (US)

(72) Inventors: Prahlad Purohit, Sunnyvale, CA (US); Vidhyalakshmi Venkitakrishnan, San Jose, CA (US); Anthony J. Li, Los Altos, CA (US)

(73) Assignee: NetApp, Inc., Sunnyvale, CA (US)

( * ) Notice: Subject to any disclaimer, the term of this patent is extended or adjusted under 35 U.S.C. 154(b) by 424 days.

(21) Appl. No.: 15/130,087

(22) Filed: Apr. 15, 2016

(65) Prior Publication Data

US 2017/0300248 A1 Oct. 19, 2017

(51) Int. Cl.
*G06F 3/06* (2006.01)
*G06F 11/30* (2006.01)

(52) U.S. Cl.
CPC ............ *G06F 3/0619* (2013.01); *G06F 3/067* (2013.01); *G06F 3/0623* (2013.01); *G06F 3/0659* (2013.01); *G06F 11/30* (2013.01)

(58) Field of Classification Search
CPC ............ G06F 17/30327; G06F 3/0619; G06F 3/0623; G06F 3/0659; G06F 3/067; G06F 11/30; G06F 3/0655; G06F 3/0665; G06F 3/0685; G06F 3/0689
USPC ........................................................... 711/114
See application file for complete search history.

(56) References Cited

U.S. PATENT DOCUMENTS 8,996,535 B1 * 3/2015 Kimmel .............. G06F 17/3033
707/747
2016/0070714 A1 3/2016 D'Sa et al.

* cited by examiner

*Primary Examiner* — Van H Oberly
(74) *Attorney, Agent, or Firm* — Cesari and McKenna, LLP

(57) ABSTRACT

A consistency checker is configured to perform repairs to one or more multi-level dense tree metadata structures shared between volumes managed by a volume layer of a storage input/output (I/O) stack executing on one or more nodes of a cluster. The volumes include a parent volume and a snapshot and/or clone, wherein the snapshot/clone may be represented as an independent volume, and embodied as a respective read-only copy (snapshot) or read-write copy (clone) of the parent volume. Illustratively, the consistency checker verifies and/or fixes (i.e., repairs) on-disk structures of the volume layer, e.g., the shared dense tree, according to a distributed repair procedure that maintains consistency properties across all volumes in a volume family and avoid cyclic repairs made in the context of different volumes sharing the dense tree.

20 Claims, 15 Drawing Sheets

US 10,191,674 B2

SHARED DENSE TREE REPAIR

BACKGROUND

Technical Field

The present disclosure relates to storage systems and, more specifically, to repair of data structures shared between volumes of a storage system.

Background Information

A storage system typically includes one or more storage devices, such as disks embodied as solid state drives (SSDs), into which information may be entered, and from which information may be obtained, as desired. The storage system may implement a high-level module, such as a file system, to logically organize the information stored on disk as storage containers, such as volumes, of the on-disk file system. Each volume may be implemented as a set of data structures, including data blocks that store data for the volumes and metadata blocks that describe the data of the volumes. For example, the metadata may describe, e.g., identify, storage locations on the devices for the data.

Management of the volumes may include creation of snapshots (read-only) and/or clones (read-write) of the (parent) volumes taken at points in time and accessed by one or more clients or hosts of the storage system. A data structure may be configured to store file system metadata that is shared between volumes (e.g., between the parent volume and the snapshot and/or clone). However, a failure of the storage system may render the on-disk file system (i.e., the parent volume and the snapshot and/or clone) inconsistent. Accordingly, it is desirable to provide an efficient workflow to validate and/or fix the data structure of the file system to ensure self-consistency in a timely manner.

BRIEF DESCRIPTION OF THE DRAWINGS

The above and further advantages of the embodiments herein may be better understood by referring to the following description in conjunction with the accompanying drawings in which like reference numerals indicate identically or functionally similar elements, of which.

OVERVIEW

Figure 1:
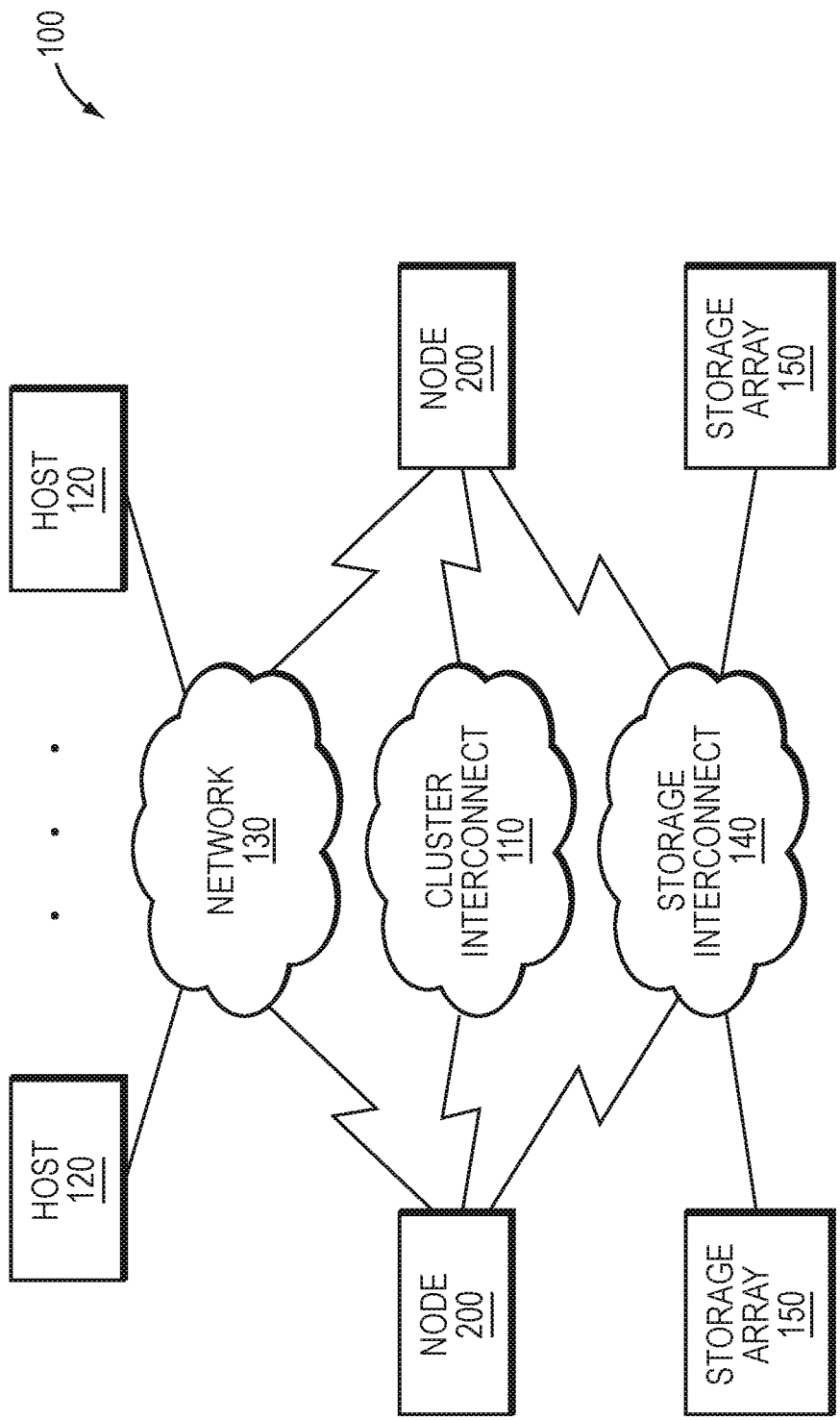
FIG. 1 is a block diagram of a plurality of nodes interconnected as a cluster.

The embodiments described herein are directed to a consistency checker configured to perform repairs to one or more multi-level dense tree metadata structures shared between volumes managed by a volume layer of a storage input/output (I/O) stack executing on one or more nodes of a cluster. Illustratively, the volumes include a parent volume and a snapshot and/or clone respectively embodied as a read-only copy (snapshot) or read-write copy (clone) of the parent volume, wherein the snapshot/clone may be represented as an independent volume. Volume metadata managed by the volume layer, i.e., parent volume metadata as well as snapshot/clone metadata, is illustratively organized as the multi-level dense tree metadata structures (dense trees) according to address space regions (e.g., disjoint offset ranges) for the volume, wherein each level of each dense tree includes volume metadata entries for storing the metadata. The snapshot/clone may be derived from a dense tree of the parent volume (parent dense tree) by sharing portions (e.g., level or volume metadata entries) of the parent dense tree with a dense tree of the snapshot/clone (snapshot/clone dense tree). As used herein, volumes that share dense trees (or portions thereof) are members of a volume family.

In an embodiment, the volume metadata entries may be organized as metadata pages having associated metadata page keys. Each level and metadata page is rendered distinct or "unique" from other levels and metadata pages through the use of a unique value in the level and metadata page. The unique value is illustratively embodied as a multi-component uniqueifier, including a generation number, contained in a header of each level and metadata page, and configured to render the level and metadata page unique across all levels of a dense tree (region), across all regions and across all volumes in the volume layer. In addition, each level of the dense tree maintains a reference counter within a respective level header to track sharing of levels between volumes in a volume family.

Illustratively, the consistency checker verifies and/or fixes (i.e., repairs) on-disk structures of the volume layer, e.g., the shared dense tree, according to a distributed repair procedure that maintains consistency properties across the volumes of the volume family, while avoiding repeat of those repairs (cyclic repairs) to the shared dense tree among the volumes of the volume family. To that end, the distributed repair procedure of the consistency checker is configured to operate in parallel (i.e., concurrently) on the dense trees shared among multiple volumes to check and repair those dense trees using a lock-free workflow, wherein the use of locks is minimized when traversing (i.e., walking) the dense trees. Illustratively, the distributed repair procedure commences at startup by, e.g., a volume layer process, which forwards a plurality of check and repair messages in parallel across the regions of the volume family to initiate performance of the consistency checker. Notably, the repairs are made only once (i.e., non-cyclic repairs) even though the checker may attempt to traverse (walk) the dense tree multiple times for volumes of the family. That is, the distributed repair procedure of the consistency checker is further configured to render non-cyclic repairs to each dense tree that ensure that the repairs are rendered once to avoid traversing the dense tree multiple times for the volumes of the volume family.

In an embodiment, each level header includes a header key to a corresponding lower level header of the dense tree. The consistency checker maintains a map in a memory of the node that indicates which header keys have been used to traverse and verify the levels/pages of the dense tree. That is, the consistency checker uses the map to traverse the shared dense tree as an acyclic graph (i.e., prevent re-traversing any level of the shared dense tree), so as to avoid making repairs more than once. Illustratively, the consistency checker uses the map to mark levels/pages of the dense tree (represented by the header key) as they are traversed and checked/repaired, so as to avoid cyclic paths and, thus, cyclic repairs. Illustratively, while walking the dense tree, the consistency checker examines the map to determine the presence of a header key corresponding to a current level of the dense tree being traversed. If the key is present in the map, the consistency checker does not check that (current) level of the dense tree as it has already been checked by virtue of its presence in the map.

The repair procedure also performs reference count validation and repair. In an embodiment, each level header of the dense tree holds a reference count (refcount) indicating a number of references to a corresponding level of the dense tree. The consistency checker may invoke a refcount repair algorithm that gathers an actual number of references (pointers) to the level header and determines whether that actual number matches the refcount recorded in the header. If not, the refcount is repaired to reflect the actual number. Further, the repair procedure includes a generation number repair. As noted, each level header includes a generation number within the uniqueifier that may be used to uniquely identify the level header of the dense tree and a metadata page within a volume family. The consistency checker may invoke a generation number repair algorithm to determine whether the generation number is corrupted and, if so, assigns a new generation number to the current level header that does not collide with other dense tree generation numbers in the volume family, while ensuring that the level headers and metadata pages of a topmost parent volume have a greatest generation number of the volume family.

DESCRIPTION

Storage Cluster

FIG. 1 is a block diagram of a plurality of nodes 200 interconnected as a cluster 100 and configured to provide storage service relating to the organization of information on storage devices. The nodes 200 may be interconnected by a cluster interconnect fabric 110 and include functional components that cooperate to provide a distributed storage architecture of the cluster 100, which may be deployed in a storage area network (SAN). As described herein, the components of each node 200 include hardware and software functionality that enable the node to connect to one or more hosts 120 over a computer network 130, as well as to one or more storage arrays 150 of storage devices over a storage interconnect 140, to thereby render the storage service in accordance with the distributed storage architecture.

Each host 120 may be embodied as a general-purpose computer configured to interact with any node 200 in accordance with a client/server model of information delivery. That is, the client (host) may request the services of the node, and the node may return the results of the services requested by the host, by exchanging packets over the network 130. The host may issue packets including file-based access protocols, such as the Network File System (NFS) protocol over the Transmission Control Protocol/Internet Protocol (TCP/IP), when accessing information on the node in the form of storage containers such as files and directories. However, in an embodiment, the host 120 illustratively issues packets including block-based access protocols, such as the Small Computer Systems Interface (SCSI) protocol encapsulated over TCP (iSCSI) and SCSI encapsulated over FC (FCP), when accessing information in the form of storage containers such as logical units (LUNs). Notably, any of the nodes 200 may service a request directed to a storage container stored on the cluster 100.

Figure 2:
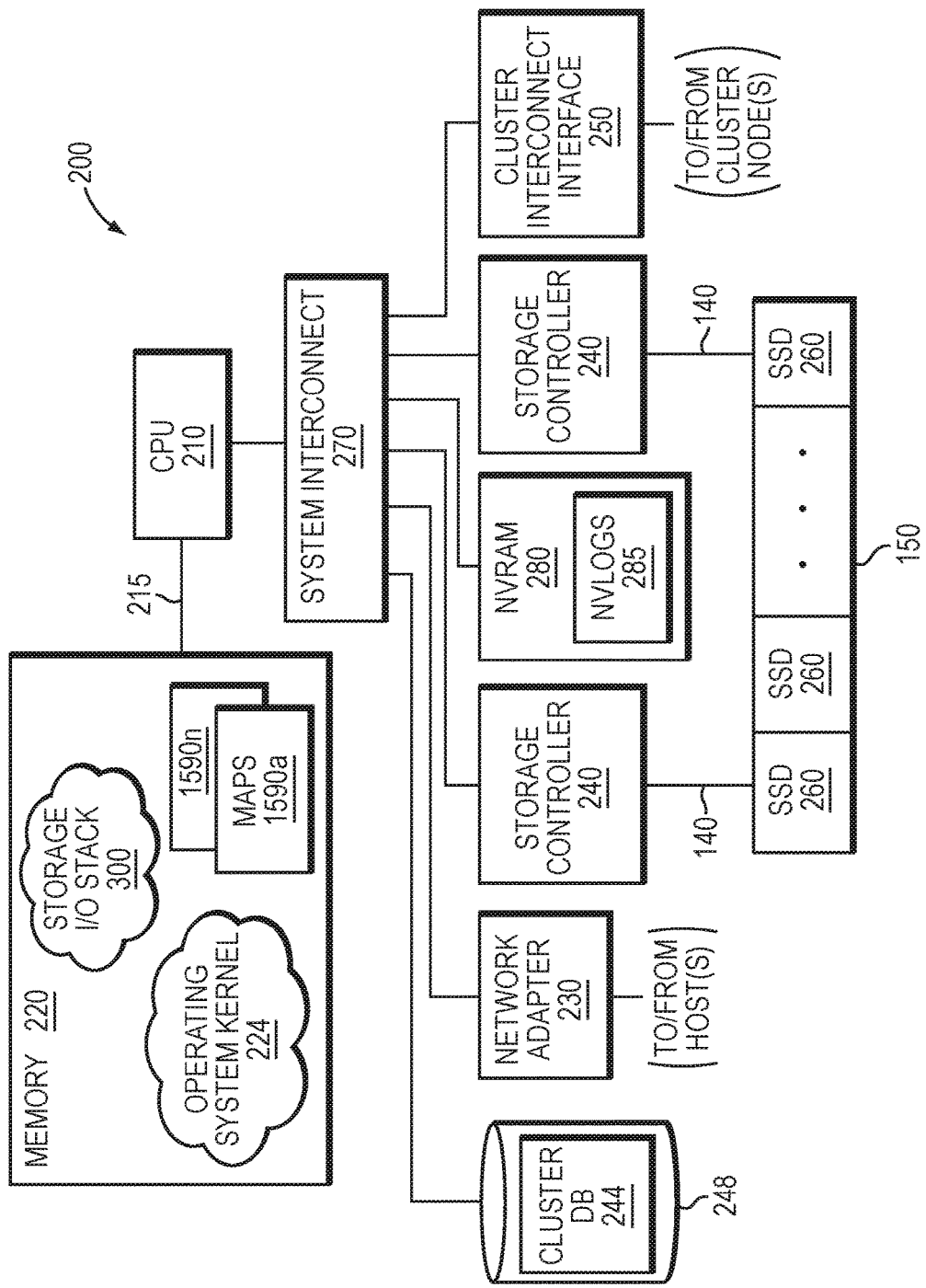
FIG. 2 is a block diagram of a node.

FIG. 2 is a block diagram of a node 200 that is illustratively embodied as a storage system having one or more central processing units (CPUs) 210 coupled to a memory 220 via a memory bus 215. The CPU 210 is also coupled to a network adapter 230, storage controllers 240, a cluster interconnect interface 250 and a non-volatile random access memory (NVRAM 280) via a system interconnect 270. The network adapter 230 may include one or more ports adapted to couple the node 200 to the host(s) 120 over computer network 130, which may include point-to-point links, wide area networks, virtual private networks implemented over a public network (Internet) or a local area network. The network adapter 230 thus includes the mechanical, electrical and signaling circuitry needed to connect the node to the network 130, which illustratively embodies an Ethernet or Fibre Channel (FC) network.

The memory 220 may include memory locations that are addressable by the CPU 210 for storing software programs and data structures associated with the embodiments described herein. The CPU 210 may, in turn, include processing elements and/or logic circuitry configured to execute the software programs, such as a storage input/output (I/O) stack 300, and manipulate the data structures. Illustratively, the storage I/O stack 300 may be implemented as a set of user mode processes that may be decomposed into a plurality of threads. An operating system kernel 224, portions of which are typically resident in memory 220 (in-core) and executed by the processing elements (i.e., CPU 210), functionally organizes the node by, inter alia, invoking operations in support of the storage service implemented by the node and, in particular, the storage I/O stack 300. A suitable operating system kernel 224 may include a general-purpose operating system, such as the UNIX® series or Microsoft Windows® series of operating systems, or an operating system with configurable functionality such as microkernels and embedded kernels. However, in an embodiment described herein, the operating system kernel is illustratively the Linux® operating system. It will be apparent to those skilled in the art that other processing and memory means, including various computer readable media, may be used to store and execute program instructions pertaining to the embodiments herein.

Each storage controller 240 cooperates with the storage I/O stack 300 executing on the node 200 to access information requested by the host 120. The information is preferably stored on storage devices such as solid state drives (SSDs) 260, illustratively embodied as flash storage devices, of storage array 150. In an embodiment, the flash storage devices may be based on NAND flash components, e.g., single-layer-cell (SLC) flash, multi-layer-cell (MLC) flash or triple-layer-cell (TLC) flash, although it will be understood to those skilled in the art that other non-volatile, solid-state electronic devices (e.g., drives based on storage class memory components) may be advantageously used with the embodiments described herein. Accordingly, the storage devices may or may not be block-oriented (i.e., accessed as blocks). The storage controller 240 includes one or more ports having I/O interface circuitry that couples to the SSDs 260 over the storage interconnect 140, illustratively embodied as a serial attached SCSI (SAS) topology. Alternatively, other point-to-point I/O interconnect arrangements, such as a conventional serial ATA (SATA) topology or a PCI topology, may be used. The system interconnect 270 may also couple the node 200 to a local service storage device 248, such as an SSD, configured to locally store cluster-related configuration information, e.g., as cluster database (DB) 244, which may be replicated to the other nodes 200 in the cluster 100.

The cluster interconnect interface 250 may include one or more ports adapted to couple the node 200 to the other node(s) of the cluster 100. In an embodiment, Infiniband may be used as the clustering protocol and interconnect fabric media, although it will be apparent to those skilled in the art that other types of protocols and interconnects may be utilized within the embodiments described herein. The NVRAM 280 may include a back-up battery or other built-in last-state retention capability (e.g., non-volatile semiconductor memory such as storage class memory) that is capable of maintaining data in light of a failure to the node and cluster environment. Illustratively, a portion of the NVRAM 280 may be configured as one or more non-volatile logs (NVLogs 285) configured to temporarily record ("log") I/O requests, such as write requests, received from the host 120.

Storage I/O Stack

Figure 3:
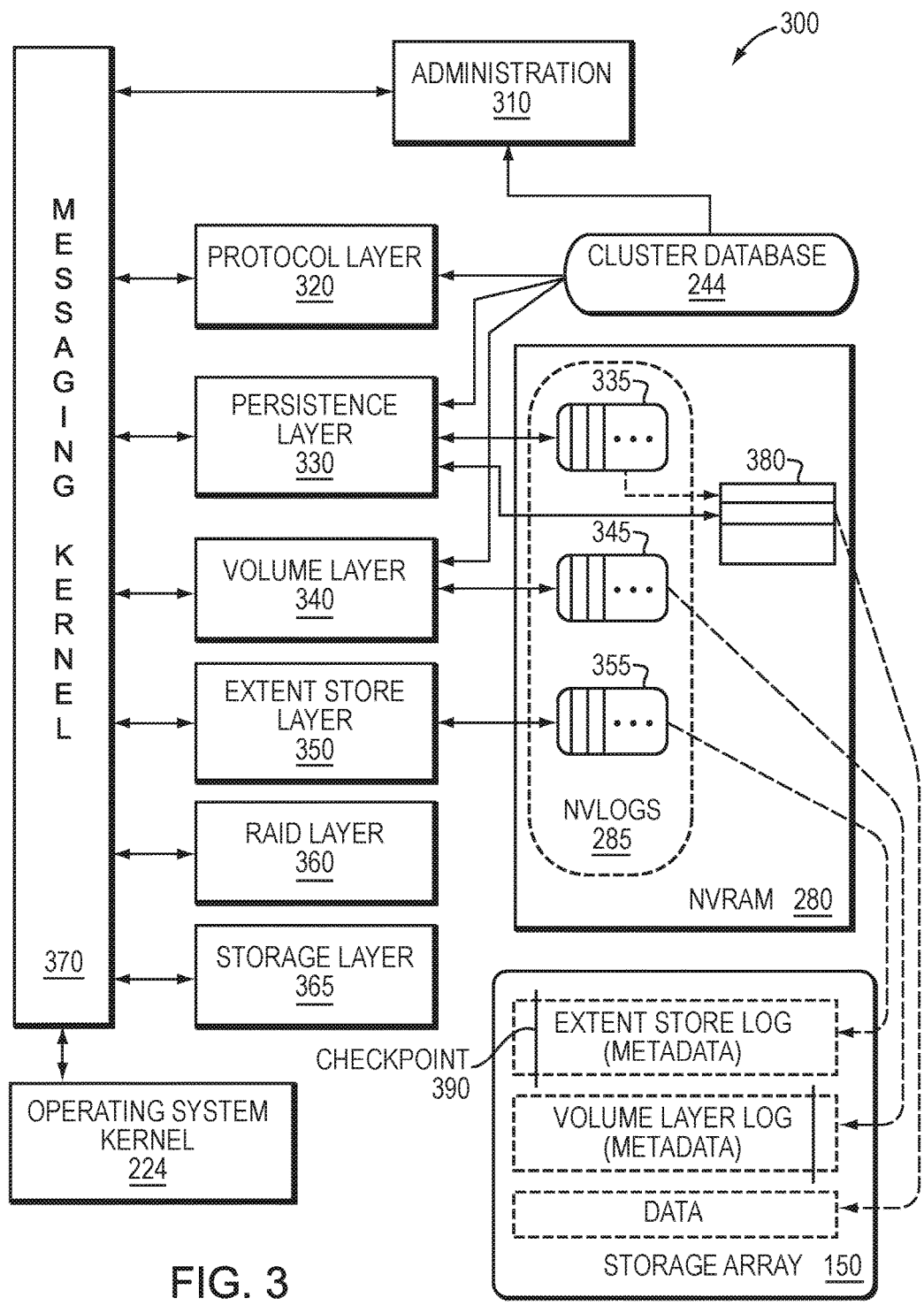
FIG. 3 is a block diagram of a storage input/output (I/O) stack of the node.

FIG. 3 is a block diagram of the storage I/O stack 300 that may be advantageously used with one or more embodiments described herein. The storage I/O stack 300 includes a plurality of software modules or layers that cooperate with other functional components of the nodes 200 to provide the distributed storage architecture of the cluster 100. In an embodiment, the distributed storage architecture presents an abstraction of a single storage container, i.e., all of the storage arrays 150 of the nodes 200 for the entire cluster 100 organized as one large pool of storage. In other words, the architecture consolidates storage, i.e., the SSDs 260 of the arrays 150, throughout the cluster (retrievable via cluster-wide keys) to enable storage of the LUNs. Both storage capacity and performance may then be subsequently scaled by adding nodes 200 to the cluster 100.

Illustratively, the storage I/O stack 300 includes an administration layer 310, a protocol layer 320, a persistence layer 330, a volume layer 340, an extent store layer 350, a Redundant Array of Independent Disks (RAID) layer 360, a storage layer 365 and a NVRAM (storing NVLogs) "layer" interconnected with a messaging kernel 370. The messaging kernel 370 may provide a message-based (or event-based) scheduling model (e.g., asynchronous scheduling) that employs messages as fundamental units of work exchanged (i.e., passed) among the layers. Suitable message-passing mechanisms provided by the messaging kernel to transfer information between the layers of the storage I/O stack 300 may include, e.g., for intra-node communication: i) messages that execute on a pool of threads, ii) messages that execute on a single thread progressing as an operation through the storage I/O stack, iii) messages using an Inter Process Communication (IPC) mechanism and, e.g., for inter-node communication: messages using a Remote Procedure Call (RPC) mechanism in accordance with a function shipping implementation. Alternatively, the I/O stack may be implemented using a thread-based or stack-based execution model. In one or more embodiments, the messaging kernel 370 allocates processing resources from the operating system kernel 224 to execute the messages. Each storage I/O stack layer may be implemented as one or more instances (i.e., processes) executing one or more threads (e.g., in kernel or user space) that process the messages passed between the layers such that the messages provide synchronization for blocking and non-blocking operation of the layers.

In an embodiment, the protocol layer 320 may communicate with the host 120 over the network 130 by exchanging discrete frames or packets configured as I/O requests according to pre-defined protocols, such as iSCSI and FCP. An I/O request, e.g., a read or write request, may be directed to a LUN and may include I/O parameters such as, inter alia, a LUN identifier (ID), a logical block address (LBA) of the LUN, a length (i.e., amount of data) and, in the case of a write request, write data. The protocol layer 320 receives the I/O request and forwards it to the persistence layer 330, which records the request into a persistent write-back cache 380, illustratively embodied as a log whose contents can be replaced randomly, e.g., under some random access replacement policy rather than only in log fashion, and returns an acknowledgement to the host 120 via the protocol layer 320. In an embodiment only I/O requests that modify the LUN, e.g., write requests, are logged. Notably, the I/O request may be logged at the node receiving the I/O request, or in an alternative embodiment in accordance with the function shipping implementation, the I/O request may be logged at another node.

Illustratively, dedicated logs may be maintained by the various layers of the storage I/O stack 300. For example, a dedicated log 335 may be maintained by the persistence layer 330 to record the I/O parameters of an I/O request as equivalent internal, i.e., storage I/O stack, parameters, e.g., volume ID, offset, and length. In the case of a write request, the persistence layer 330 may also cooperate with the NVRAM 280 to implement the write-back cache 380 configured to store the write data associated with the write request. Notably, the write data for the write request may be physically stored in the log 355 such that the cache 380 contains the reference to the associated write data. That is, the write-back cache may be structured as a log. In an embodiment, a copy of the write-back cache may be also maintained in the memory 220 to facilitate direct memory access to the storage controllers. In other embodiments, caching may be performed at the host 120 or at a receiving node in accordance with a protocol that maintains coherency between the write data stored at the cache and the cluster.

In an embodiment, the administration layer 310 may apportion the LUN into multiple volumes, each of which may be partitioned into multiple regions (e.g., allotted as disjoint block address ranges), with each region having one or more segments stored as multiple stripes on the array 150. A plurality of volumes distributed among the nodes 200 may thus service a single LUN, i.e., each volume within the LUN services a different LBA range (i.e., offset and length, hereinafter offset and range) or set of ranges within the LUN. Accordingly, the protocol layer 320 may implement a volume mapping technique to identify a volume to which the I/O request is directed (i.e., the volume servicing the offset range indicated by the parameters of the I/O request). Illustratively, the cluster database 244 may be configured to maintain one or more associations (e.g., key-value pairs) for each of the multiple volumes, e.g., an association between the LUN ID and a volume, as well as an association between the volume and a node ID for a node managing the volume.

The administration layer 310 may also cooperate with the database 244 to create (or delete) one or more volumes associated with the LUN (e.g., creating a volume ID/LUN key-value pair in the database 244). Using the LUN ID and LBA (or LBA range), the volume mapping technique may provide a volume ID (e.g., using appropriate associations in the cluster database 244) that identifies the volume and node servicing the volume destined for the request, as well as translate the LBA (or LBA range) into an offset and length within the volume. Specifically, the volume ID is used to determine a volume layer instance that manages volume metadata associated with the LBA or LBA range. As noted, the protocol layer may pass the I/O request (i.e., volume ID, offset and length) to the persistence layer 330, which may use the function shipping (e.g., inter-node) implementation to forward the I/O request to the appropriate volume layer instance executing on a node in the cluster based on the volume ID.

In an embodiment, the volume layer 340 may manage the volume metadata by, e.g., maintaining states of host-visible containers, such as ranges of LUNs, and performing data management functions, such as creation of snapshots and clones, for the LUNs in cooperation with the administration layer 310. The volume metadata is illustratively embodied as in-core mappings from LUN addresses (i.e., LBAs) to durable extent keys, which are unique cluster-wide IDs associated with SSD storage locations for extents within an extent key space of the cluster-wide storage container. That is, an extent key may be used to retrieve the data of the extent at an SSD storage location associated with the extent key. Alternatively, there may be multiple storage containers in the cluster wherein each container has its own extent key space, e.g., where the host provides distribution of extents among the storage containers and cluster-wide (across containers) de-duplication is infrequent. An extent is a variable length block of data that provides a unit of storage on the SSDs and that need not be aligned on any specific boundary, i.e., it may be byte aligned. Accordingly, an extent may be an aggregation of write data from a plurality of write requests to maintain such alignment. Illustratively, the volume layer 340 may record the forwarded request (e.g., information or parameters characterizing the request), as well as changes to the volume metadata, in dedicated log 345 maintained by the volume layer 340. Subsequently, the contents of the volume layer log 345 may be written to the storage array 150 in accordance with retirement of log entries, while a checkpoint (e.g., synchronization) operation stores in-core metadata on the array 150. That is, the checkpoint operation (checkpoint) ensures that a consistent state of metadata, as processed in-core, is committed to (stored on) the storage array 150; whereas the retirement of log entries ensures that the entries accumulated in the volume layer log 345 synchronize with the metadata checkpoints committed to the storage array 150 by, e.g., retiring those accumulated log entries prior to the checkpoint. In one or more embodiments, the checkpoint and retirement of log entries may be data driven, periodic or both.

In an embodiment, the extent store layer 350 is responsible for storing extents on the SSDs 260 (i.e., on the storage array 150) and for providing the extent keys to the volume layer 340 (e.g., in response to a forwarded write request). The extent store layer 350 is also responsible for retrieving data (e.g., an existing extent) using an extent key (e.g., in response to a forwarded read request). In an alternative embodiment, the extent store layer 350 is responsible for performing de-duplication and compression on the extents prior to storage. The extent store layer 350 may maintain in-core mappings (e.g., embodied as hash tables) of extent keys to SSD storage locations (e.g., offset on an SSD 260 of array 150). The extent store layer 350 may also maintain a dedicated log 355 of entries that accumulate requested "put" and "delete" operations (i.e., write requests and delete requests for extents issued from other layers to the extent store layer 350), where these operations change the in-core mappings (i.e., hash table entries). Subsequently, the in-core mappings and contents of the extent store layer log 355 may be written to the storage array 150 in accordance with a "fuzzy" checkpoint 390 (i.e., checkpoint with incremental changes that span multiple log files) in which selected in-core mappings, less than the total, are committed to the array 150 at various intervals (e.g., driven by an amount of change to the in-core mappings, size thresholds of log 355, or periodically). Notably, the accumulated entries in log 355 may be retired once all in-core mappings have been committed and then, illustratively, for those entries prior to the first interval.

In an embodiment, the RAID layer 360 may organize the SSDs 260 within the storage array 150 as one or more RAID groups (e.g., sets of SSDs) that enhance the reliability and integrity of extent storage on the array by writing data "stripes" having redundant information, i.e., appropriate parity information with respect to the striped data, across a given number of SSDs 260 of each RAID group. The RAID layer 360 may also store a number of stripes (e.g., stripes of sufficient depth), e.g., in accordance with a plurality of contiguous range write operations, so as to reduce data relocation (i.e., internal flash block management) that may occur within the SSDs as a result of the operations. In an embodiment, the storage layer 365 implements storage I/O drivers that may communicate directly with hardware (e.g., the storage controllers and cluster interface) cooperating with the operating system kernel 224, such as a Linux virtual function I/O (VFIO) driver.

Write Path

Figure 4:
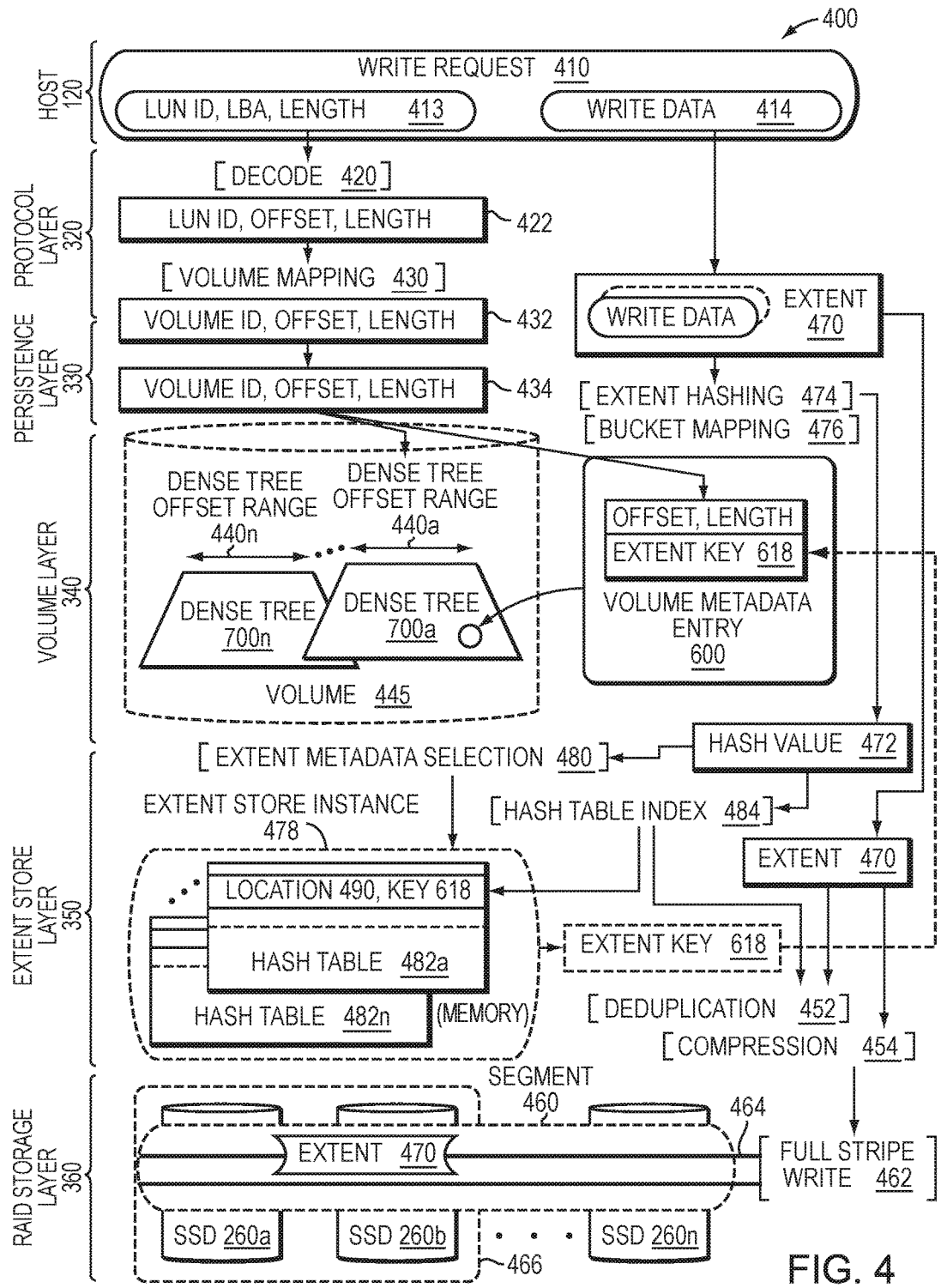
FIG. 4 illustrates a write path of the storage I/O stack.

FIG. 4 illustrates an I/O (e.g., write) path 400 of the storage I/O stack 300 for processing an I/O request, e.g., a SCSI write request 410. The write request 410 may be issued by host 120 and directed to a LUN stored on the storage arrays 150 of the cluster 100. Illustratively, the protocol layer 320 receives and processes the write request by decoding 420 (e.g., parsing and extracting) fields of the request, e.g., LUN ID, LBA and length (shown at 413), as well as write data 414. The protocol layer 320 may use the results 422 from decoding 420 for a volume mapping technique 430 (described above) that translates the LUN ID and LBA range (i.e., equivalent offset and length) of the write request to an appropriate volume layer instance, i.e., volume ID (volume 445), in the cluster 100 that is responsible for managing volume metadata for the LBA range. In an alternative embodiment, the persistence layer 330 may implement the above described volume mapping technique 430. The protocol layer then passes the results 432, e.g., volume ID, offset, length (as well as write data), to the persistence layer 330, which records the request in the persistence layer log 335 and returns an acknowledgement to the host 120 via the protocol layer 320. As described herein, the persistence layer 330 may aggregate and organize write data 414 from one or more write requests into a new extent 470 and perform a hash computation, i.e., a hash function, on the new extent to generate a hash value 472 in accordance with an extent hashing technique 474.

The persistence layer 330 may then pass the write request with aggregated write data including, e.g., the volume ID, offset and length, as parameters 434 to the appropriate volume layer instance. In an embodiment, message passing of the parameters 434 (received by the persistence layer) may be redirected to another node via the function shipping mechanism, e.g., RPC, for inter-node communication. Alternatively, message passing of the parameters 434 may be via the IPC mechanism, e.g., message threads, for intra-node communication.

In one or more embodiments, a bucket mapping technique 476 is provided that translates the hash value 472 to an instance of an appropriate extent store layer (e.g., extent store instance 478) that is responsible for storing the new extent 470. Note that the bucket mapping technique may be implemented in any layer of the storage I/O stack above the extent store layer. In an embodiment, for example, the bucket mapping technique may be implemented in the persistence layer 330, the volume layer 340, or a layer that manages cluster-wide information, such as a cluster layer (not shown). Accordingly, the persistence layer 330, the volume layer 340, or the cluster layer may contain computer executable instructions executed by the CPU 210 to perform operations that implement the bucket mapping technique 476 described herein. The persistence layer 330 may then pass the hash value 472 and the new extent 470 to the appropriate volume layer instance and onto the appropriate extent store instance via an extent store put operation. The extent hashing technique 474 may embody an approximately uniform hash function to ensure that any random extent to be written may have an approximately equal chance of falling into any extent store instance 478, i.e., hash buckets are evenly distributed across extent store instances of the cluster 100 based on available resources. As a result, the bucket mapping technique 476 provides load-balancing of write operations (and, by symmetry, read operations) across nodes 200 of the cluster, while also leveling flash wear in the SSDs 260 of the cluster.

In response to the put operation, the extent store instance may process the hash value 472 to perform an extent metadata selection technique 480 that (i) selects an appropriate hash table 482 (e.g., hash table 482a) from a set of hash tables (illustratively in-core) within the extent store instance 478, and (ii) extracts a hash table index 484 from the hash value 472 to index into the selected hash table and lookup a table entry having an extent key 618 identifying a storage location 490 on SSD 260 for the extent. Accordingly, the persistence layer 330, the volume layer 340, or the cluster layer may contain computer executable instructions executed by the CPU 210 to perform operations that implement the extent metadata selection technique 480 described herein. If a table entry with a matching extent key is found, then the SSD location 490 mapped from the extent key 618 is used to retrieve an existing extent (not shown) from SSD. The existing extent is then compared with the new extent 470 to determine whether their data is identical. If the data is identical, the new extent 470 is already stored on SSD 260 and a de-duplication opportunity (denoted de-duplication 452) exists such that there is no need to write another copy of the data. Accordingly, a reference count (not shown) in the table entry for the existing extent is incremented and the extent key 618 of the existing extent is passed to the appropriate volume layer instance for storage within an entry (denoted as volume metadata entry 600) of a dense tree metadata structure (e.g., dense tree 700a), such that the extent key 618 is associated an offset range 440 (e.g., offset range 440a) of the volume 445.

However, if the data of the existing extent is not identical to the data of the new extent 470, a collision occurs and a deterministic algorithm is invoked to sequentially generate as many new candidate extent keys (not shown) mapping to the same bucket as needed to either provide de-duplication 452 or produce an extent key that is not already stored within the extent store instance. Notably, another hash table (e.g. hash table 482n) may be selected by a new candidate extent key in accordance with the extent metadata selection technique 480. In the event that no de-duplication opportunity exists (i.e., the extent is not already stored) the new extent 470 is compressed in accordance with compression technique 454 and passed to the RAID layer 360, which processes the new extent 470 for storage on SSD 260 within one or more stripes 464 of RAID group 466. The extent store instance may cooperate with the RAID layer 360 to identify a storage segment 460 (i.e., a portion of the storage array 150) and a location on SSD 260 within the segment 460 in which to store the new extent 470. Illustratively, the identified storage segment is a segment with a large contiguous free space having, e.g., location 490 on SSD 260b for storing the extent 470.

In an embodiment, the RAID layer 360 then writes the stripes 464 across the RAID group 466, illustratively as one or more full write stripe 462. The RAID layer 360 may write a series of stripes 464 of sufficient depth to reduce data relocation that may occur within the flash-based SSDs 260 (i.e., flash block management). The extent store instance then (i) loads the SSD location 490 of the new extent 470 into the selected hash table 482n (i.e., as selected by the new candidate extent key) and (ii) passes a new extent key (denoted as extent key 618) to the appropriate volume layer instance for storage within an entry (also denoted as volume metadata entry 600) of a dense tree 700 managed by that volume layer instance, and (iii) records a change to extent metadata of the selected hash table in the extent store layer log 355. Illustratively, the volume layer instance selects dense tree 700a spanning an offset range 440a of the volume 445 that encompasses the offset range of the write request. As noted, the volume 445 (e.g., an offset space of the volume) is partitioned into multiple regions (e.g., allotted as disjoint offset ranges); in an embodiment, each region is represented by a dense tree 700. The volume layer instance then inserts the volume metadata entry 600 into the dense tree 700a and records a change corresponding to the volume metadata entry in the volume layer log 345. Accordingly, the I/O (write) request is sufficiently stored on SSD 260 of the cluster.

Read Path

Figure 5:
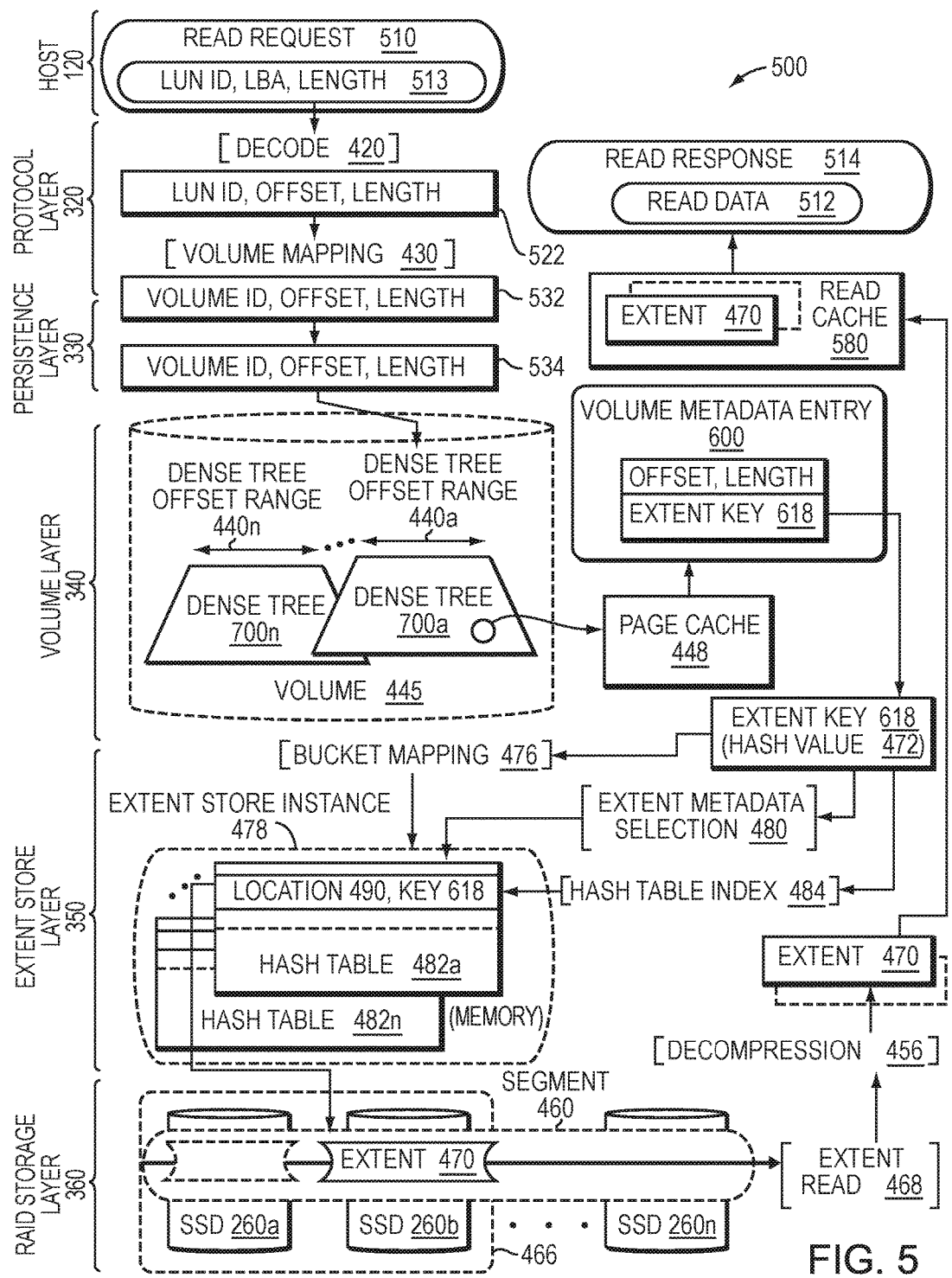
FIG. 5 illustrates a read path of the storage I/O stack.

FIG. 5 illustrates an I/O (e.g., read) path 500 of the storage I/O stack 300 for processing an I/O request, e.g., a SCSI read request 510. The read request 510 may be issued by host 120 and received at the protocol layer 320 of a node 200 in the cluster 100. Illustratively, the protocol layer 320 processes the read request by decoding 420 (e.g., parsing and extracting) fields of the request, e.g., LUN ID, LBA, and length (shown at 513), and uses the results 522, e.g., LUN ID, offset, and length, for the volume mapping technique 430. That is, the protocol layer 320 may implement the volume mapping technique 430 (described above) to translate the LUN ID and LBA range (i.e., equivalent offset and length) of the read request to an appropriate volume layer instance, i.e., volume ID (volume 445), in the cluster 100 that is responsible for managing volume metadata for the LBA (i.e., offset) range. The protocol layer then passes the results 532 to the persistence layer 330, which may search the write cache 380 to determine whether some or all of the read request can be service from its cache data. If the entire request cannot be serviced from the cached data, the persistence layer 330 may then pass the remaining portion of the request including, e.g., the volume ID, offset and length, as parameters 534 to the appropriate volume layer instance in accordance with the function shipping mechanism (e.g., RPC, for inter-node communication) or the IPC mechanism (e.g., message threads, for intra-node communication).

The volume layer instance may process the read request to access a dense tree metadata structure (e.g., dense tree 700a) associated with a region (e.g., offset range 440a) of a volume 445 that encompasses the requested offset range (specified by parameters 532). The volume layer instance may further process the read request to search for (lookup) one or more volume metadata entries 600 of the dense tree 700a to obtain one or more extent keys 618 associated with one or more extents 470 within the requested offset range. As described further herein, each dense tree 700 may be embodied as multiple levels of a search structure with possibly overlapping offset range entries at each level. The entries, i.e., volume metadata entries 600, provide mappings from host-accessible LUN addresses, i.e., LBAs, to durable extent keys. The various levels of the dense tree may have volume metadata entries 600 for the same offset, in which case the higher level has the newer entry and is used to service the read request. A top level of the dense tree 700 is illustratively resident in-core and a page cache 448 may be used to access lower levels of the tree. If the requested range or portion thereof is not present in the top level, a metadata page associated with an index entry at the next lower tree level is accessed. The metadata page (i.e., in the page cache 448) at the next level is then searched (e.g., a binary search) to find any overlapping entries. This process is then iterated until one or more volume metadata entries 600 of a level are found to ensure that the extent key(s) 618 for the entire requested read range are found. If no metadata entries exist for the entire or portions of the requested read range, then the missing portion(s) are zero filled.

Once found, each extent key 618 is processed by the volume layer 340 to, e.g., implement the bucket mapping technique 476 that translates the extent key to an appropriate extent store instance 478 responsible for storing the requested extent 470. Note that, in an embodiment, each extent key 618 may be substantially identical to the hash value 472 associated with the extent 470, i.e., the hash value as calculated during the write request for the extent, such that the bucket mapping 476 and extent metadata selection 480 techniques may be used for both write and read path operations. Note also that the extent key 618 may be derived from the hash value 472. The volume layer 340 may then pass the extent key 618 (i.e., the hash value from a previous write request for the extent) to the appropriate extent store instance 478 (via an extent store get operation), which performs an extent key-to-SSD mapping to determine the location on SSD 260 for the extent.

In response to the get operation, the extent store instance may process the extent key 618 (i.e., hash value 472) to perform the extent metadata selection technique 480 that (i) selects an appropriate hash table (e.g., hash table 482a) from a set of hash tables within the extent store instance 478, and (ii) extracts a hash table index 484 from the extent key 618 (i.e., hash value 472) to index into the selected hash table and lookup a table entry having a matching extent key 618 that identifies a storage location 490 on SSD 260 for the extent 470. That is, the SSD location 490 mapped to the extent key 618 may be used to retrieve the existing extent (denoted as extent 470) from SSD 260 (e.g., SSD 260b). The extent store instance then cooperates with the RAID layer 360 to access the extent on SSD 260b and retrieve the data contents in accordance with the read request. Illustratively, the RAID layer 360 may read the extent in accordance with an extent read operation 468 and pass the extent 470 to the extent store instance. The extent store instance may then decompress the extent 470 in accordance with a decompression technique 456, although it will be understood to those skilled in the art that decompression can be performed at any layer of the storage I/O stack 300. The extent 470 may be stored in a buffer (not shown) in memory 220 and a reference to that buffer may be passed back through the layers of the storage I/O stack. The persistence layer may then load the extent into a read cache 580 (or other staging mechanism) and may extract appropriate read data 512 from the read cache 580 for the LBA range of the read request 510. Thereafter, the protocol layer 320 may create a SCSI read response 514, including the read data 512, and return the read response to the host 120.

Dense Tree Volume Metadata

As noted, a host-accessible LUN may be apportioned into multiple volumes, each of which may be partitioned into one or more regions, wherein each region is associated with a disjoint offset range, i.e., a LBA range, owned by an instance of the volume layer 340 executing on a node 200. For example, assuming a maximum volume size of 64 terabytes (TB) and a region size of 16 gigabytes (GB), a volume may have up to 4096 regions (i.e., 16 GB×4096=64 TB). In an embodiment, region 1 may be associated with an offset range of, e.g., 0-16 GB, region 2 may be associated with an offset range of 16 GB-32 GB, and so forth. Ownership of a region denotes that the volume layer instance manages metadata, i.e., volume metadata, for the region, such that I/O requests destined to a LBA range within the region are directed to the owning volume layer instance. Thus, each volume layer instance manages volume metadata for, and handles I/O requests to, one or more regions. A basis for metadata scale-out in the distributed storage architecture of the cluster 100 includes partitioning of a volume into regions and distributing of region ownership across volume layer instances of the cluster.

Volume metadata, as well as data storage, in the distributed storage architecture is illustratively extent based. The volume metadata of a region that is managed by the volume layer instance is illustratively embodied as in memory (in-core) and on SSD (on-flash) volume metadata configured to provide mappings from host-accessible LUN addresses, i.e., LBAs, of the region to durable extent keys. In other words, the volume metadata maps LBA ranges of the LUN to data of the LUN (via extent keys) within the respective LBA range. In an embodiment, the volume layer organizes the volume metadata (embodied as volume metadata entries 600) as a data structure, i.e., a dense tree metadata structure (dense tree 700), which maps an offset range within the region to one or more extent keys. That is, the LUN data (user data) stored as extents (accessible via extent keys) is associated with LUN LBA ranges represented as volume metadata (also stored as extents).

Figure 6:
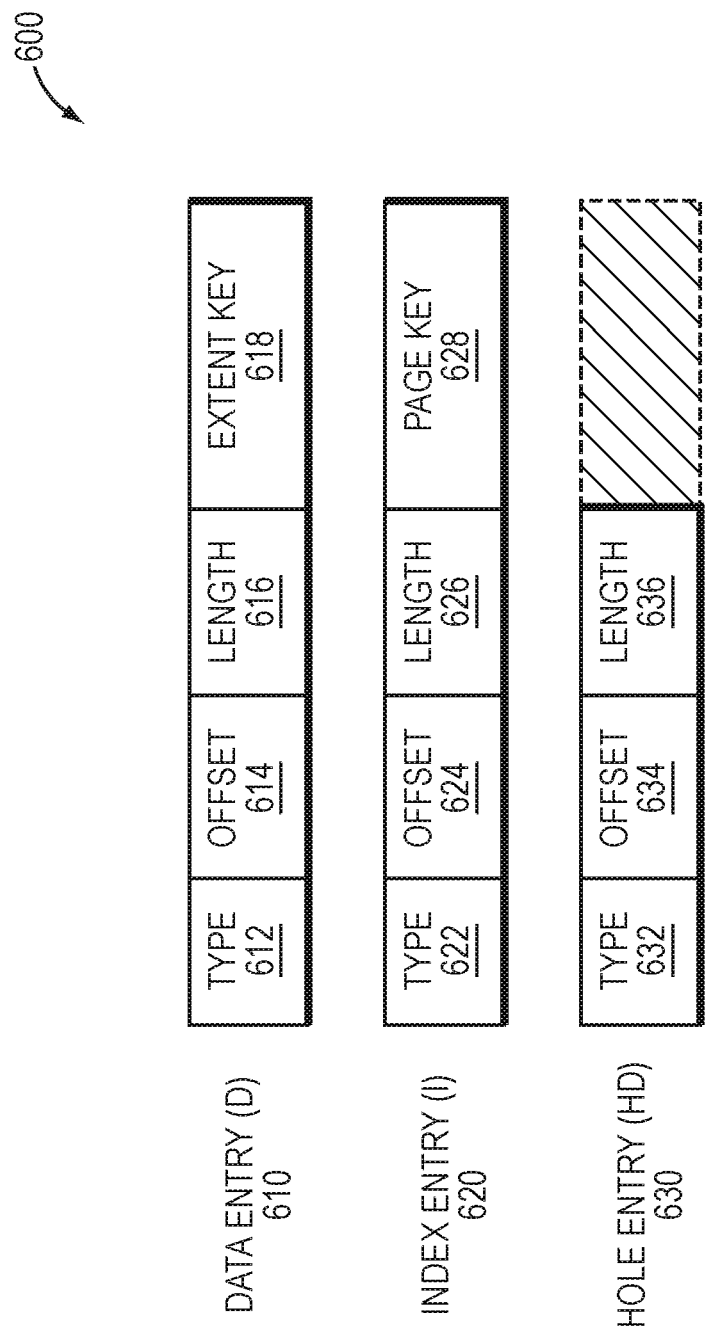
FIG. 6 is a block diagram of a volume metadata entry.

FIG. 6 is a block diagram of a volume metadata entry 600 of the dense tree metadata structure. Each volume metadata entry 600 of the dense tree 700 may be a descriptor that embodies one of a plurality of types, including a data entry (D) 610, an index entry (I) 620, and a hole entry (H) 630. The data entry (D) 610 is configured to map (offset, length) to an extent key for an extent (user data) and includes the following content: type 612, offset 614, length 616 and extent key 618. The index entry (I) 620 is configured to map (offset, length) to a page key (e.g., an extent key) of a metadata page (stored as an extent), i.e., a page containing one or more volume metadata entries, at a next lower level of the dense tree; accordingly, the index entry 620 includes the following content: type 622, offset 624, length 626 and page key 628. Illustratively, the index entry 620 manifests as a pointer from a higher level to a lower level, i.e., the index entry 620 essentially serves as linkage between the different levels of the dense tree. The hole entry (H) 630 represents absent data as a result of a hole punching operation at (offset, length) and includes the following content: type 632, offset 634, and length 636.

Figure 7:
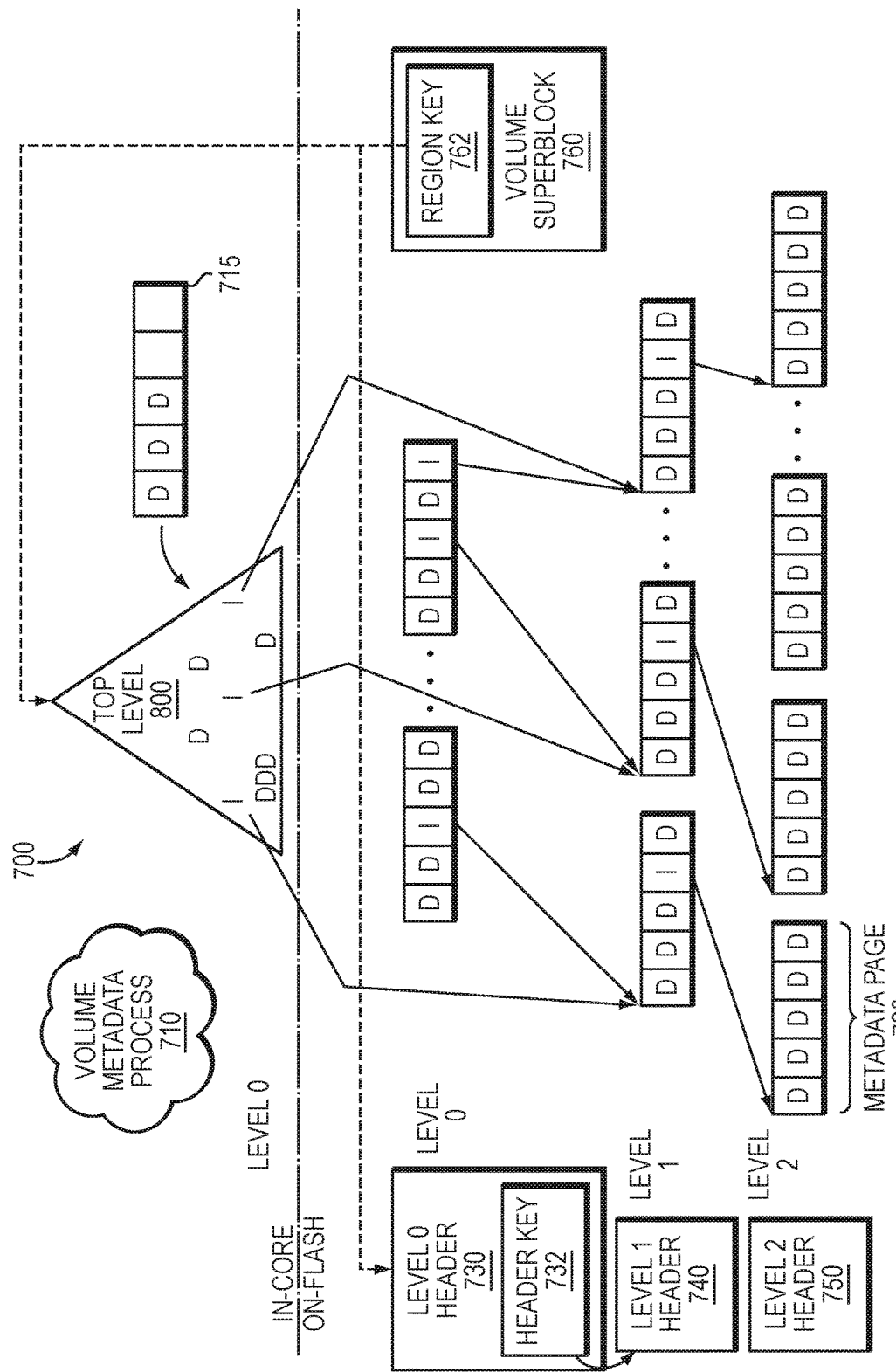
FIG. 7 is a block diagram of a dense tree metadata structure.

FIG. 7 is a block diagram of the dense tree metadata structure that may be advantageously used with one or more embodiments described herein. The dense tree metadata structure 700 is configured to provide mappings of logical offsets within a LUN (or volume) to extent keys managed by one or more extent store instances. Illustratively, the dense tree metadata structure is organized as a multi-level dense tree 700, where a top level 800 represents recent volume metadata changes and subsequent descending levels represent older changes. Specifically, a higher level of the dense tree 700 is updated first and, when that level fills, an adjacent lower level is updated, e.g., via a merge operation. A latest version of the changes may be searched starting at the top level of the dense tree and working down to the descending levels. Each level of the dense tree 700 includes fixed size records or entries, i.e., volume metadata entries 600, for storing the volume metadata. A volume metadata process 710 illustratively maintains the top level 800 of the dense tree in memory (in-core) as a balanced tree that enables indexing by offsets. The volume metadata process 710 also maintains a fixed sized (e.g., 4 KB) in-core buffer as a staging area (i.e., an in-core staging buffer 715) for volume metadata entries 600 inserted into the balanced tree (i.e., top level 800). Each level of the dense tree is further maintained on-flash as a packed array of volume metadata entries, wherein the entries are stored as extents illustratively organized as fixed sized (e.g., 4 KB) metadata pages 720. Notably, the staging buffer 715 is de-staged to SSD upon a trigger, e.g., the staging buffer is full. In an embodiment, each metadata page 720 has a unique identifier (ID) which guarantees that no two metadata pages can have the same content, however, in accordance with the improved COW technique described herein, such a guarantee is relaxed in that multiple references to a same page are allowed. That is, no duplicate pages are stored, but a metadata page may be referenced multiple times.

In an embodiment, the multi-level dense tree 700 includes three (3) levels, although it will be apparent to those skilled in the art that additional levels N of the dense tree may be included depending on parameters (e.g., size) of the dense tree configuration. Illustratively, the top level 800 of the tree is maintained in-core as level 0 and the lower levels are maintained on-flash as levels 1 and 2. In addition, copies of the volume metadata entries 600 stored in staging buffer 715 may also be maintained on-flash as, e.g., a level 0 linked list. A leaf level, e.g., level 2, of the dense tree contains data entries 610, whereas a non-leaf level, e.g., level 0 or 1, may contain both data entries 610 and index entries 620. Each index entry (I) 620 at level N of the tree is configured to point to (reference) a metadata page 720 at level N+1 of the tree. Each level of the dense tree 600 also includes a header (e.g., level 0 header 730, level 1 header 740 and level 2 header 750) that contains per level information, such as reference counts associated with the extents. Each upper level header contains a header key (an extent key for the header, e.g., header key 732 of level 0 header 730) to a corresponding lower level header. A region key 762 to a root, e.g., level 0 header 730 (and top level 800), of the dense tree 700 is illustratively stored on-flash and maintained in a volume root extent, e.g., a volume superblock 760. Notably, the volume superblock 760 contains region keys to the roots of the dense tree metadata structures for all regions in a volume.

Figure 8:
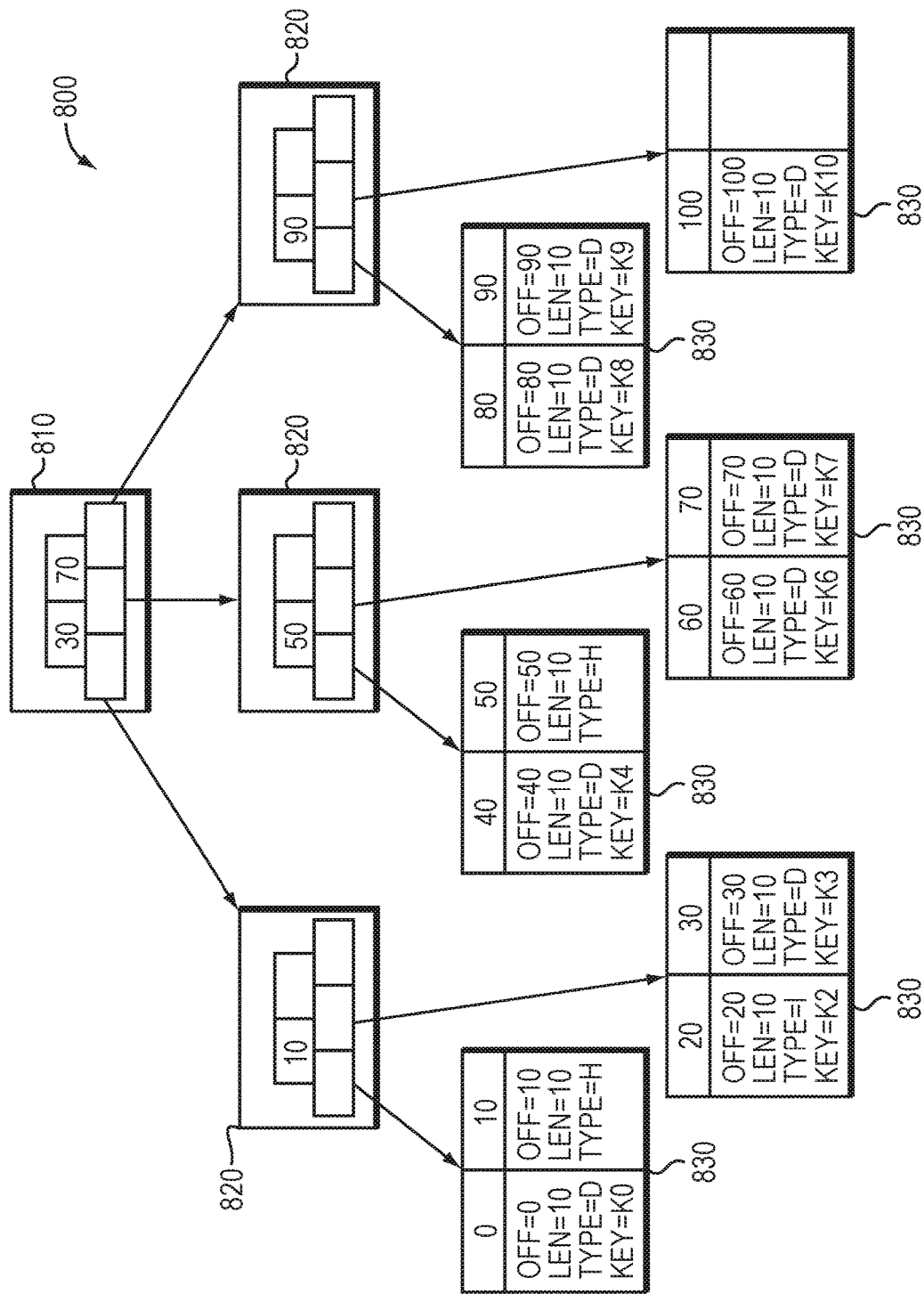
FIG. 8 is a block diagram of a top level of the dense tree metadata structure.

FIG. 8 is a block diagram of the top level 800 of the dense tree metadata structure. As noted, the top level (level 0) of the dense tree 700 is maintained in-core as a balanced tree, which is illustratively embodied as a B+ tree data structure. However, it will be apparent to those skilled in the art that other data structures, such as AVL trees, Red-Black trees, and heaps (partially sorted trees), may be advantageously used with the embodiments described herein. The B+ tree (top level 800) includes a root node 810, one or more internal nodes 820 and a plurality of leaf nodes (leaves) 830. The volume metadata stored on the tree is preferably organized in a manner that is efficient both to search in order to service read requests and to traverse (walk) in ascending order of offset to accomplish merges to lower levels of the tree. The B+ tree has certain properties that satisfy these requirements, including storage of all data (i.e., volume metadata entries 600) in leaves 830 and storage of the leaves as sequentially accessible, e.g., as one or more linked lists. Both of these properties make sequential read requests for write data (i.e., extents) and read operations for dense tree merge more efficient. Also, since it has a much higher fan-out than a binary search tree, the illustrative B+ tree results in more efficient lookup operations. As an optimization, the leaves 830 of the B+ tree may be stored in a page cache 448, making access of data more efficient than other trees. In addition, resolution of overlapping offset entries in the B+ tree optimizes read requests of extents. Accordingly, the larger the fraction of the B+ tree (i.e., volume metadata) maintained in-core, the less loading (reading) or metadata from SSD is required so as to reduce read amplification.

Figure 9:
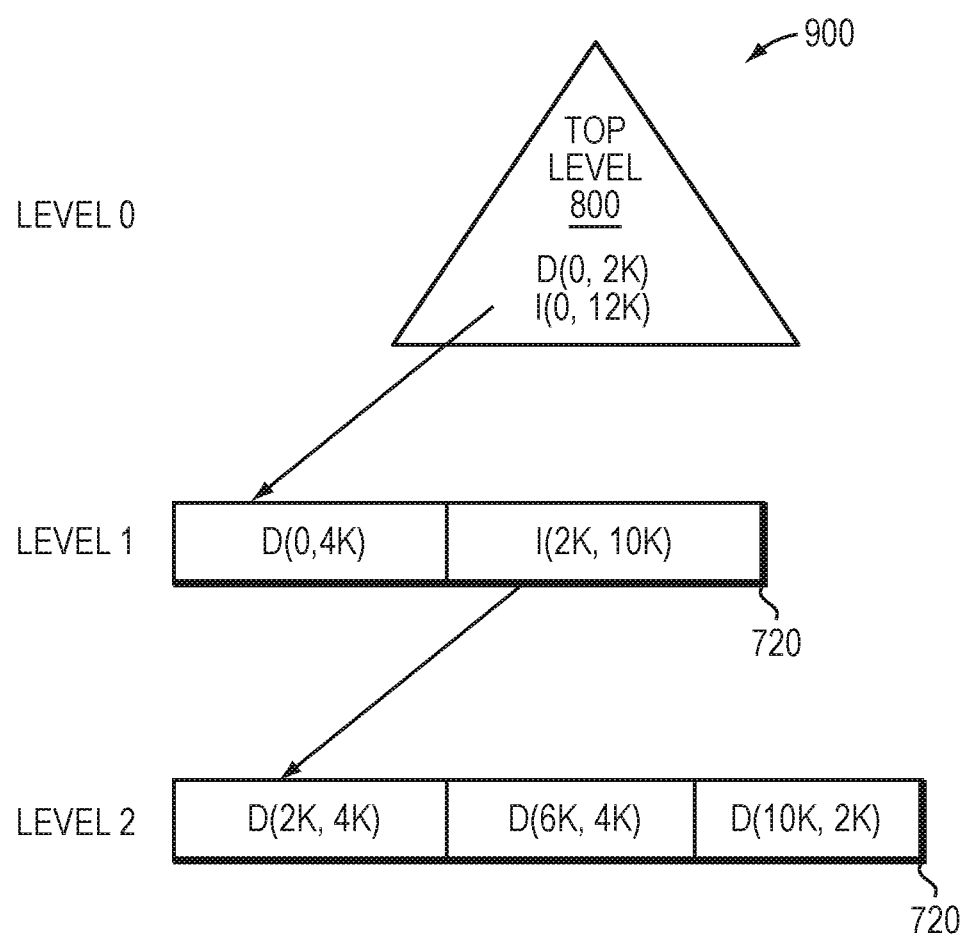
FIG. 9 illustrates mapping between levels of the dense tree metadata structure.

FIG. 9 illustrates mappings 900 between levels of the dense tree metadata structure. Each level of the dense tree 700 includes one or more metadata pages 720, each of which contains multiple volume metadata entries 600. In an embodiment, each volume metadata entry 600 has a fixed size, e.g., 12 bytes, such that a predetermined number of entries may be packed into each metadata page 720. As noted, the data entry (D) 610 is a map of (offset, length) to an address of (user) data which is retrievable using extent key 618 (i.e., from an extent store instance). The (offset, length) illustratively specifies an offset range of a LUN. The index entry (I) 620 is a map of (offset, length) to a page key 628 of a metadata page 720 at the next lower level. Illustratively, the offset in the index entry (I) 620 is the same as the offset of the first entry in the metadata page 720 at the next lower level. The length 626 in the index entry 620 is illustratively the cumulative length of all entries in the metadata page 720 at the next lower level (including gaps between entries).

For example, the metadata page 720 of level 1 includes an index entry "I(2K,10K)" that specifies a starting offset 2K and an ending offset 12K (i.e., 2K+10K=12K); the index entry (I) illustratively points to a metadata page 720 of level 2 covering the specified range. An aggregate view of the data entries (D) packed in the metadata page 720 of level 2 covers the mapping from the smallest offset (e.g., 2K) to the largest offset (e.g., 12K). Thus, each level of the dense tree 700 may be viewed as an overlay of an underlying level. For instance the data entry "D(0,4K)" of level 1 overlaps 2K of the underlying metadata in the page of level 2 (i.e., the range 2K,4K).

Figure 10:
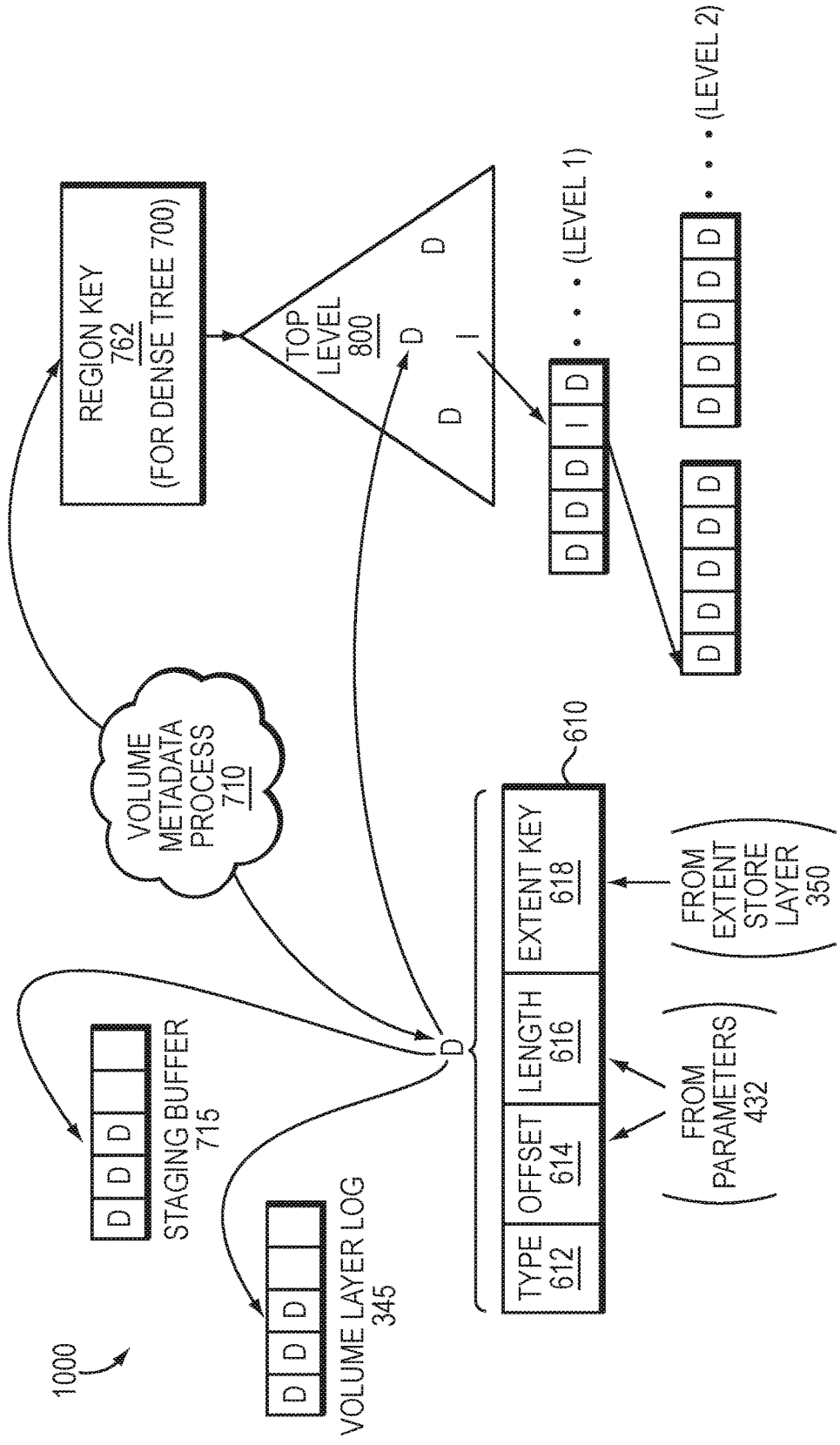
FIG. 10 illustrates a workflow for inserting a volume metadata entry into the dense tree metadata structure in accordance with a write request.

In one or more embodiments, operations for volume metadata managed by the volume layer 340 include insertion of volume metadata entries, such as data entries 610, into the dense tree 700 for write requests. As noted, each dense tree 700 may be embodied as multiple levels of a search structure with possibly overlapping offset range entries at each level, wherein each level is a packed array of entries (e.g., sorted by offset) and where leaf entries have an LBA range (offset, length) and extent key. FIG. 10 illustrates a workflow 1000 for inserting a volume metadata entry into the dense tree metadata structure in accordance with a write request. In an embodiment, volume metadata updates (changes) to the dense tree 700 occur first at the top level of the tree, such that a complete, top-level description of the changes is maintained in memory 220. Operationally, the volume metadata process 710 applies the region key 762 to access the dense tree 700 (i.e., top level 800) of an appropriate region (e.g., LBA range 440 as determined from the parameters 432 derived from the write request 410). Upon completion of a write request, the volume metadata process 710 creates a volume metadata entry, e.g., a new data entry 610, to record a mapping of offset/length-to-extent key (i.e., LBA range-to-user data). Illustratively, the new data entry 610 includes an extent key 618 (i.e., from the extent store layer 350) associated with data (i.e., extent 470) of the write request 410, as well as offset 614 and length 616 (i.e., from the write parameters 432) and type 612 (i.e., data entry D).

The volume metadata process 710 then updates the volume metadata by inserting (adding) the data entry D into the level 0 staging buffer 715, as well as into the top level 800 of dense tree 700 and the volume layer log 345. In the case of an overwrite operation, the overwritten extent and its mapping should be deleted. The deletion process is similar to that of hole punching (un-map). When the level 0 is full, i.e., no more entries can be stored, the volume metadata entries 600 from the level 0 in-core are merged to lower levels (maintained on SSD), i.e., level 0 merges to level 1 which may then merge to level 2 and so on (e.g., a single entry added at level 0 may trigger a merger cascade). Note, any entries remaining in the staging buffer 715 after level 0 is full also may be merged to lower levels. The level 0 staging buffer is then emptied to allow space for new entries 600.

Dense Tree Volume Metadata Checkpointing

When a level of the dense tree 700 is full, volume metadata entries 600 of the level are merged with the next lower level of the dense tree. As part of the merge, new index entries 620 are created in the level to point to new lower level metadata pages 720, i.e., data entries from the level are merged (and pushed) to the lower level so that they may be "replaced" with an index reference in the level. The top level 800 (i.e., level 0) of the dense tree 700 is illustratively maintained in-core such that a merge operation to level 1 facilitates a checkpoint to SSD 260. The lower levels (i.e., levels 1 and/or 2) of the dense tree are illustratively maintained on-flash and updated (e.g., merged) as a batch operation (i.e., processing the entries of one level with those of a lower level) when the higher levels are full. The merge operation illustratively includes a sort, e.g., a 2-way merge sort operation. A parameter of the dense tree 700 is the ratio K of the size of level N−1 to the size of level N. Illustratively, the size of the array at level N is K times larger than the size of the array at level N−1, i.e., sizeof(level N)=K*sizeof(level N−1). After K merges from level N−1, level N becomes full (i.e., all entries from a new, fully-populated level N−1 are merged with level N, iterated K times.)

Figure 11:
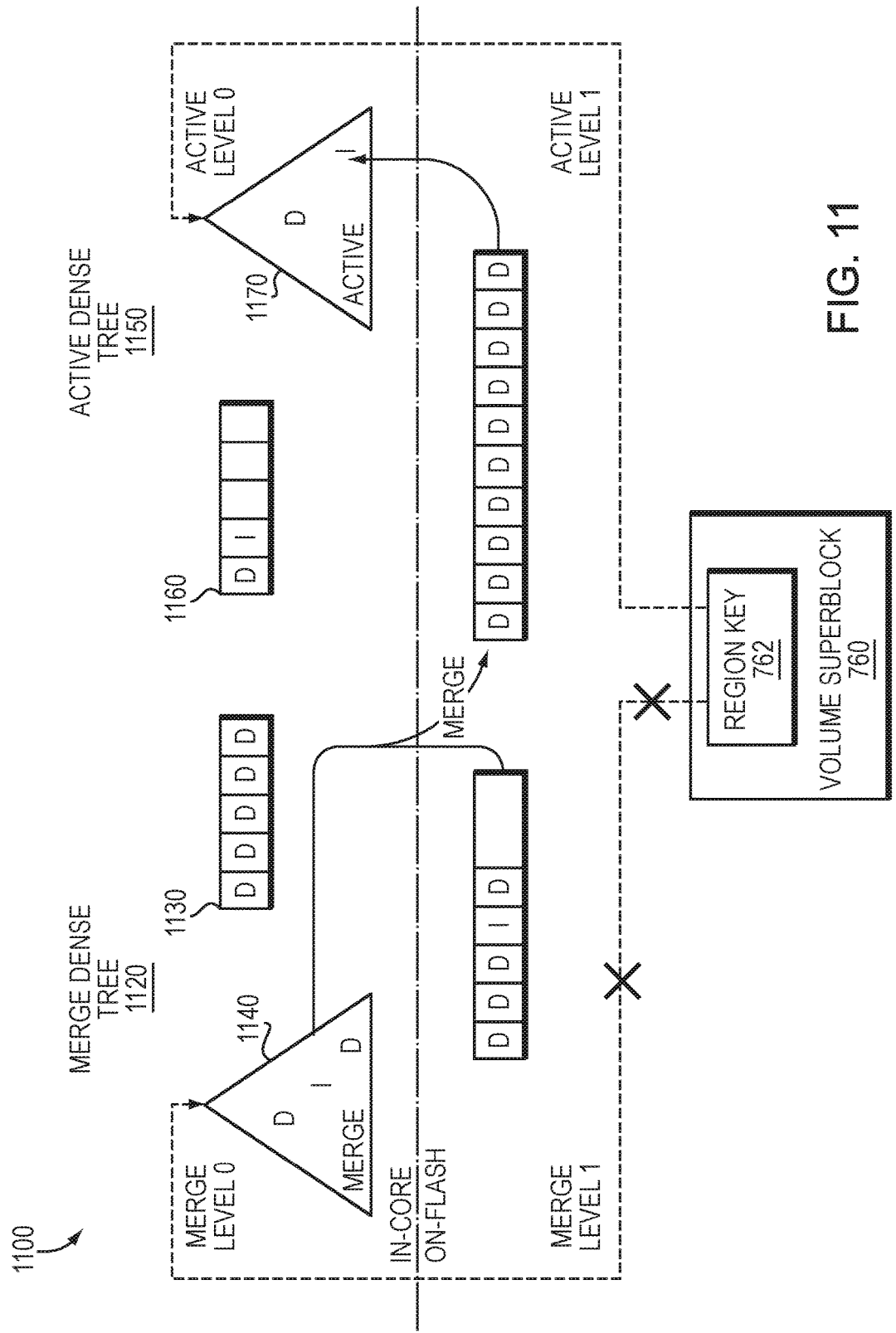
FIG. 11 illustrates merging between levels of the dense tree metadata structure.

FIG. 11 illustrates merging 1100 between levels, e.g., levels 0 and 1, of the dense tree metadata structure. In an embodiment, a merge operation is triggered when level 0 is full. When performing the merge operation, the dense tree metadata structure transitions to a "merge" dense tree structure (shown at 1120) that merges, while an alternate "active" dense tree structure (shown at 1150) is utilized to accept incoming data. Accordingly, two in-core level 0 staging buffers 1130, 1160 are illustratively maintained for concurrent merge and active (write) operations, respectively. In other words, an active staging buffer 1160 and active top level 1170 of active dense tree 1150 handle in-progress data flow (i.e, active user read and write requests), while a merge staging buffer 1130 and merge top level 1140 of merge dense tree 1120 handle consistency of the data during a merge operation. That is, a "double buffer" arrangement may be used to maintain consistency of data (i.e., entries in the level 0 of the dense tree) while processing active operations.

During the merge operation, the merge staging buffer 1130, as well as the top level 1140 and lower level array (e.g., merge level 1) are read-only and are not modified. The active staging buffer 1160 is configured to accept the incoming (user) data, i.e., the volume metadata entries received from new put operations are loaded into the active staging buffer 1160 and added to the top level 1170 of the active dense tree 1150. Illustratively, merging from level 0 to level 1 within the merge dense tree 1120 results in creation of a new active level 1 for the active dense tree 1150, i.e., the resulting merged level 1 from the merge dense tree is inserted as a new level 1 into the active dense tree. A new index entry I is computed to reference the new active level 1 and the new index entry I is loaded into the active staging buffer 1160 (as well as in the active top level 1170). Upon completion of the merge, the region key 762 of volume superblock 760 is updated to reference (point to) the root, e.g., active top level 1170 and active level 0 header (not shown), of the active dense tree 1150, thereby deleting (i.e., rendering inactive) merge level 0 and merge level 1 of the merge dense tree 1120. The merge staging buffer 1130 thus becomes an empty inactive buffer until the next merge. The merge data structures (i.e., the merge dense tree 1120 including staging buffer 1130) may be maintained in-core and "swapped" as the active data structures at the next merge (i.e., "double buffered").

Snapshot and/or Clones

As noted, the LUN ID and LBA (or LBA range) of an I/O request are used to identify a volume (e.g., of a LUN) to which the request is directed, as well as the volume layer (instance) that manages the volume and volume metadata associated with the LBA range. Management of the volume and volume metadata may include data management functions, such as creation of snapshots and/or clones, for the LUN. Illustratively, the snapshots/clones may be represented as independent volumes accessible by host 120 as LUNs, and embodied as respective read-only copies, i.e., snapshots, and read-write copies, i.e., clones, of the volume (hereinafter "parent volume") associated with the LBA range. The volume layer 340 may interact with other layers of the storage I/O stack 300, e.g., the persistence layer 330 and the administration layer 310, to manage both administration aspects, e.g., snapshot/clone creation, of the snapshot and clone volumes, as well as the volume metadata, i.e., in-core mappings from LBAs to extent keys, for those volumes. Accordingly, the administration layer 310, persistence layer 330, and volume layer 340 contain computer executable instructions executed by the CPU 210 to perform operations that create and manage the snapshots and clones described herein.

In one or more embodiments, the volume metadata managed by the volume layer, i.e., parent volume metadata and snapshot/clone metadata, is illustratively organized as one or more multi-level dense tree metadata structures, wherein each level of the dense tree metadata structure (dense tree) includes volume metadata entries for storing the metadata. Each snapshot/clone may be derived from a dense tree of the parent volume (parent dense tree) to thereby enable fast and efficient snapshot/clone creation in terms of time and consumption of metadata storage space. To that end, portions (e.g., levels or volume metadata entries) of the parent dense tree may be shared with the snapshot/clone to support time and space efficiency of the snapshot/clone, i.e., portions of the parent volume divergent from the snapshot/clone volume are not shared. Illustratively, the parent volume and clone may be considered "active," in that each actively processes (i.e., accepts) additional I/O requests which modify or add (user) data to the respective volume; whereas a snapshot is read-only and, thus, does not modify volume (user) data, but may still process non-modifying I/O requests (e.g., read requests).

Figure 12:
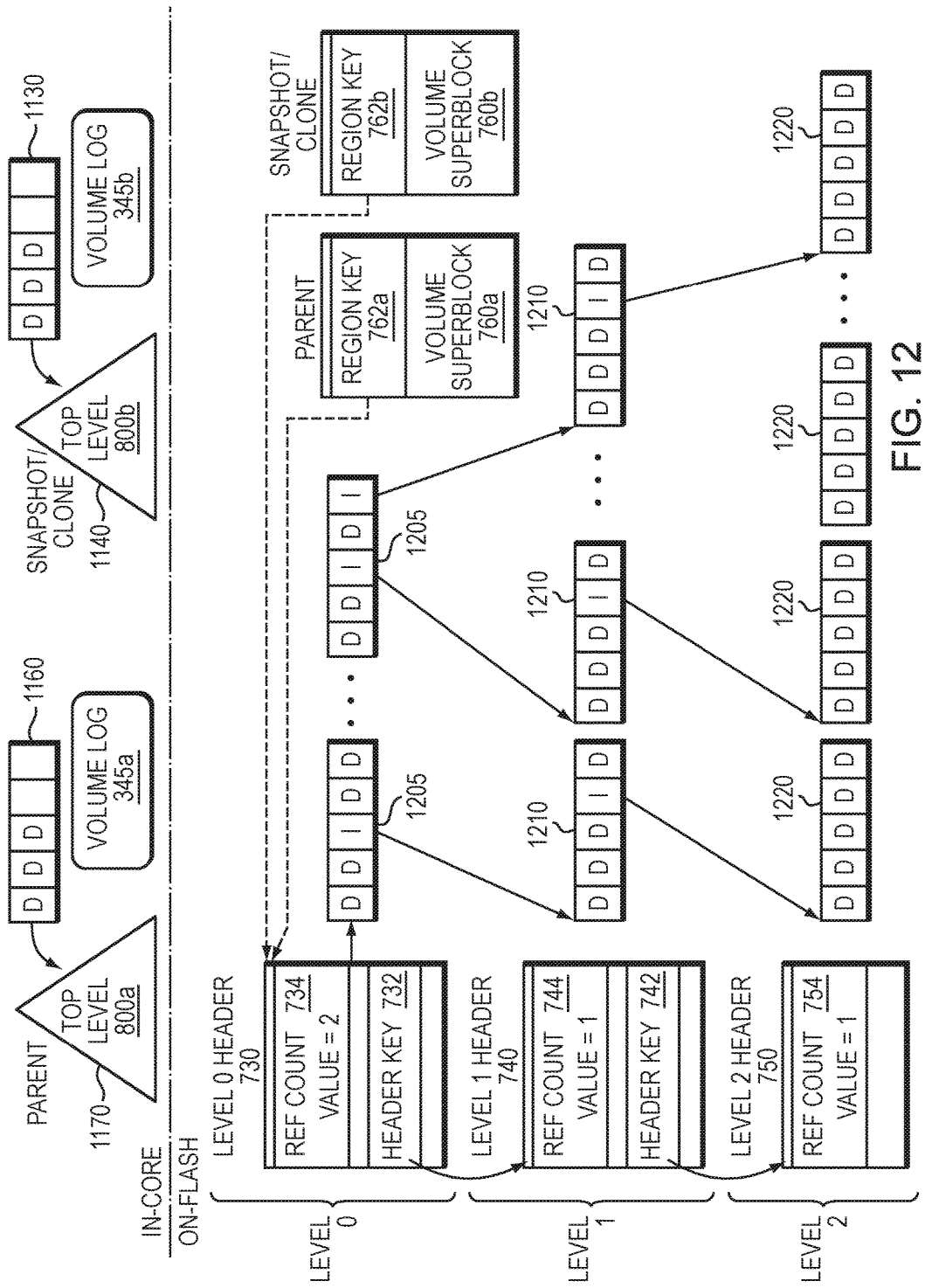
FIG. 12 is a block diagram of a dense tree metadata structure shared between a parent volume and snapshot/clone.

FIG. 12 is a block diagram of a dense tree metadata structure shared between a parent volume and a snapshot/clone. In an embodiment, creation of a snapshot/clone may include copying an in-core portion of the parent dense tree to a dense tree of the snapshot/clone (snapshot/clone dense tree). That is, the in-core level 0 staging buffer and in-core top level of the parent dense tree may be copied to create the in-core portion of the snapshot/clone dense tree, i.e., parent staging buffer 1160 may be copied to create snapshot/clone staging buffer 1130, and top level 800a (shown at 1170) may be copied to create snapshot/clone top level 800b (shown at 1140). Note that although the parent volume layer log 345a may be copied to create snapshot/clone volume layer log 345b, the volume metadata entries of the parent volume log 345a recorded (i.e., logged) after initiation of snapshot/clone creation may not be copied to the log 345b, as those entries may be directed to the parent volume and not to the snapshot/clone. Lower levels of the parent dense tree residing on SSDs may be initially shared between the parent volume and snapshot/clone. As the parent volume and snapshot/clone diverge, the levels may split to accommodate new data. That is, as new volume metadata entries are written to a level of the parent dense tree, that level is copied (i.e., split) to the snapshot/clone dense tree so that the parent dense tree may diverge from its old (now copied to the snapshot/clone) dense tree structure.

A reference counter may be maintained for each level of the dense tree, illustratively within a respective level header (reference counters 734, 744, 754) to track sharing of levels between the volumes (i.e., between the parent volume and snapshot/clone). Illustratively, the reference counter may increment when levels are shared and decremented when levels are split (e.g., copied). For example, a reference count value of 1 may indicate an unshared level (i.e., portion) between the volumes (i.e., has only one reference). In an embodiment, volume metadata entries of a dense tree do not store data, but only reference data (as extents) stored on the storage array 150 (e.g., on SSDs 260). Consequently, more than one level of a dense tree may reference the same extent (data) even when the level reference counter is 1. This may result from a split (i.e., copy) of a dense tree level brought about by creation of the snapshot/clone. Accordingly, a separate reference count is maintained for each extent in the extent store layer to track sharing of extents among volumes. In accordance with the improved COW technique described herein, the sharing of level 0 as a whole between volumes is refined to permit sharing of individual metadata pages, thereby avoiding copying the entire level 0 when a page of that level diverges between the parent volume and the snapshot/clone.

In an embodiment, the reference counter 734 for level 0 (in a level-0 header) may be incremented, illustratively from value 1 to 2, to indicate that the level 0 array contents are shared by the parent volume and snapshot/clone. Illustratively, the volume superblock of the parent volume (parent volume superblock 760a) and a volume superblock of the snapshot/clone (snapshot/clone volume superblock 760b) may be updated to point to the level-0 header, e.g., via region key 762a,b. Notably, the copies of the in-core data structures may be rendered in conjunction with the merge operation (described with reference to FIG. 11) such that the "merge dense tree 1120" copy of in-core data structures (e.g., the top level 1140 and staging buffer 1130) may become the in-core data structures of the snapshot/clone dense tree by not deleting (i.e., maintaining as active rather than rendering inactive) those copied in-core data structures. In addition, the snapshot/clone volume superblock 760b may be created by the volume layer 340 in response to an administrative operation initiated by the administration layer 310.

Figure 13:
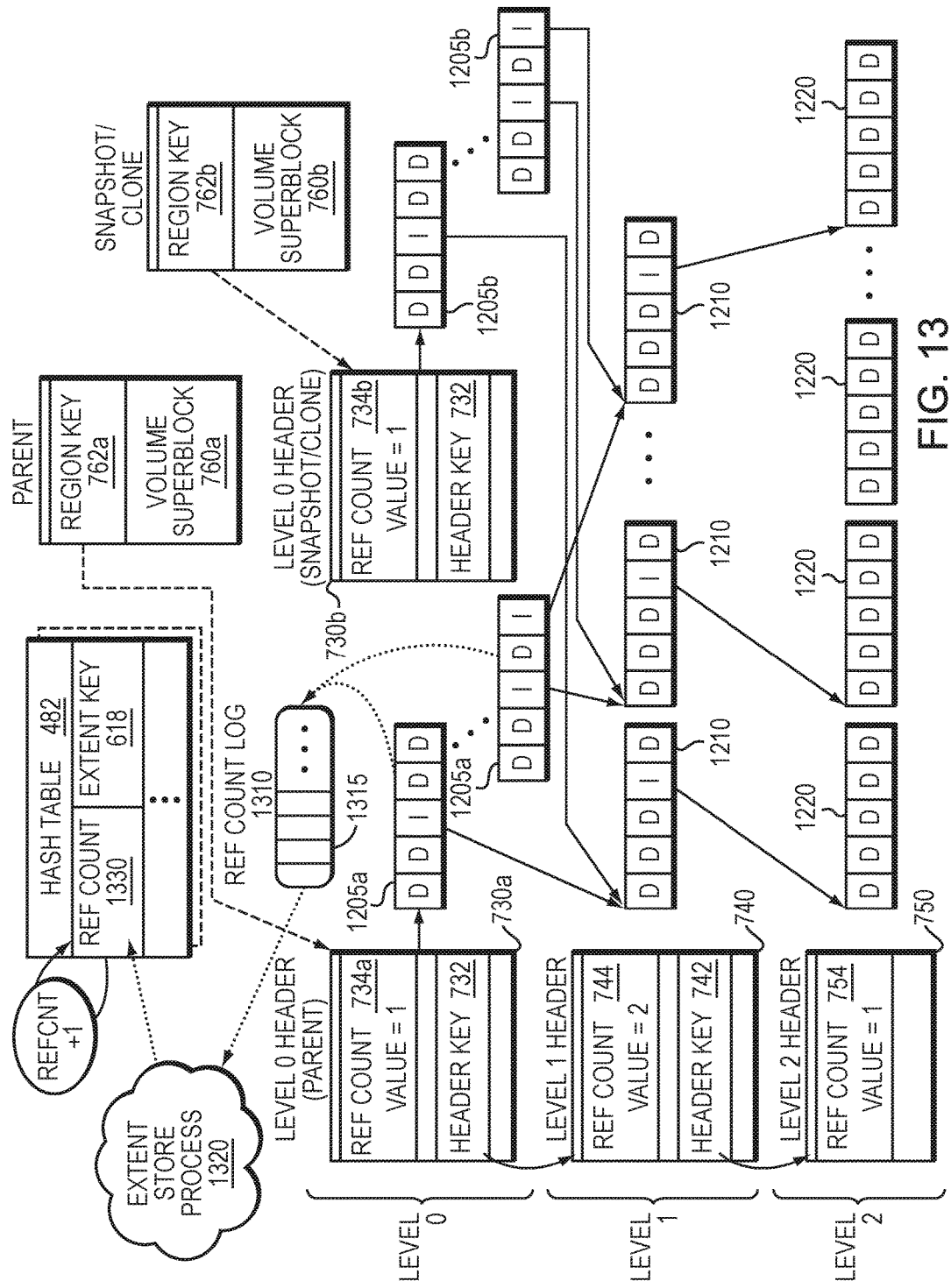
FIG. 13 illustrates diverging of the snapshot/clone from the parent volume.

Over time, the snapshot/clone may split or diverge from the parent volume when either modifies the level 0 array as a result of new I/O operations, e.g., a write request. FIG. 13 illustrates diverging of the snapshot/clone from the parent volume. In an embodiment, divergence as a result of modification to the level 0 array 1205a of the parent volume illustratively involves creation of a copy of the on-flash level 0 array for the snapshot/clone (array 1205b), as well as creation of a copy of the level 0 header 730a for the snapshot/clone (header 730b). As a result, the on-flash level 1 array 1210 becomes a shared data structure between the parent volume and snapshot/clone.

Accordingly, the reference counters for the parent volume and snapshot/clone level 0 arrays may be decremented (i.e., ref count 734a and 734b of the parent volume and snapshot/clone level 0 headers 730a, 730b, respectively), because each level 0 array now has one less reference (e.g., the volume superblocks 760a and 760b each reference separate level 0 arrays 1205a and 1205b). In addition, the reference counter 744 for the shared level 1 array may be incremented (e.g., the level 1 array is referenced by the two separate level 0 arrays, 1205a and 1205b). Notably, a reference counter 754 in the header 750 for the next level, i.e., level 2, need not be incremented because no change in references from level 1 to level 2 have been made, i.e., the single level 1 array 1210 still references level 2 array 1220.

Similarly, over time, level N (e.g., levels 1 or 2) of the snapshot/clone may diverge from the parent volume when that level is modified, for example, as a result of a merge operation. In the case of level 1, a copy of the shared level 1 array may be created for the snapshot/clone such that the on-flash level 2 array becomes a shared data structure between the level 1 array of the parent volume and a level 1 array of the snapshot/clone (not shown). Reference counters 744 for the parent volume level 1 array and the snapshot/clone level 1 array (not shown) may be decremented, while the reference counter 754 for the shared level 2 array may be incremented. Note that this technique may be repeated for each dense tree level that diverges from the parent volume, i.e., a copy of the lowest (leaf) level (e.g., level 2) of the parent volume array may be created for the snapshot/clone.

Note also that as long as the reference counter is greater than 1, the data contents of the array are pinned (cannot be deleted).

Nevertheless, the extents for each data entry in the parent volume and the snapshot/clone (e.g., the level 0 array 1205a,b) may still have two references (i.e., the parent volume and snapshot/clone) even if the reference count 734a,b of the level 0 header 730a,b is 1. That is, even though the level 0 arrays (1205a and 1205b) may have separate volume layer references (i.e., volume superblocks 760a and 760b), the underlying extents 470 may be shared and, thus, may be referenced by more than one volume (i.e., the parent volume and snapshot/clone). Note that the parent volume and snapshot/clone each reference (initially) the same extents 470 in the data entries, i.e., via extent key 618 in data entry 610, of their respective level 0 arrays 1205a,b. Accordingly, a reference counter associated with each extent 470 may be incremented to track multiple (volume) references to the extent, i.e., to prevent inappropriate deletion of the extent. Illustratively, a reference counter associated with each extent key 618 may be embodied as an extent store (ES) reference count (refcount) 1330 stored in an entry of an appropriate hash table 482 serviced by an extent store process 1320. Incrementing of the ES refcount 1330 for each extent key (e.g., in a data entry 610) in level 0 of the parent volume may be a long running operation, e.g., level 0 of the parent volume may contain thousands of data entries. This operation may illustratively be performed in the background through a refcount log 1310, which may be stored persistently on SSD.

Illustratively, extent keys 618 obtained from the data entries 610 of level 0 of the parent volume may be queued, i.e., recorded, by the volume metadata process 710 (i.e., the volume layer instance servicing the parent volume) on the refcount log 1310 as entries 1315. Extent store process 1320 (i.e., the extent store layer instance servicing the extents) may receive each entry 1315 and increment the refcount 1330 of the hash table entry containing the appropriate the extent key. That is, the extent store process/instance 1320 may index (e.g., search using the extent metadata selection technique 480) the hash tables 482a-n to find an entry having the extent key in the ref count log entry 1315. Once the hash table entry is found, the refcount 1330 of that entry may be incremented (e.g., refcnt+1). Notably, the extent store instance may process the ref count log entries 1315 at a different priority (i.e., higher or lower) than "put" and "get" operations from user I/O requests directed to that instance.

Efficient Copy-On-Write

As noted, creation of the snapshot/clone may include copying the in-core portion of the parent dense tree to the snapshot/clone dense tree. Subsequently, the snapshot/clone may split or diverge from the parent volume when either modifies the level 0 array as a result of new I/O operations, e.g., a write request. Divergence as a result of modification to the level 0 array of the parent volume illustratively involves creation of a copy of the level 0 array for the snapshot/clone, as well as creation of a copy of the level 0 header for the snapshot/clone. In the embodiment previously described above, reference counts are maintained for each level (in the level header) of the dense tree as a whole, which requires copying an entire level when any page of that level diverges between the parent volume and the snapshot/clone. In addition, as noted above, a reference count 1330 for each extent may be incremented in deferred fashion via the refcount log 1310. Notably, the refcount log also may be illustratively used to defer increment of the level 0 reference count 734. Copying of the in-core portion and level (e.g., level 0 array) involves the copy-on-write (COW) operation and it is desirable to provide an efficient COW operation for the shared dense tree.

To improve the efficiency of the COW operation, reference count operations, e.g., make-reference (mkref) and un-reference (unref) operations, are used on the metadata pages (specifically to the metadata page keys of the metadata pages) stored in the in-core portion and on-flash level 0 array so as to allow sharing of those metadata pages individually between the parent volume and the snapshot/clone, which, in turn, avoids copying those metadata pages. Such reference count operations may be similarly extended to other levels (e.g., level 1 and 2) of the dense tree. As noted, the volume metadata entries 600 may be organized as metadata pages 720 (e.g., stored as extents 470) having associated metadata page keys 628 (e.g., embodied as extent keys 618). Each metadata page may be rendered distinct or "unique" from other metadata pages in the extent store layer 350 through the use of a unique value in the metadata page. The unique value is illustratively embodied as a multi-component uniqueifier contained in a header of each metadata page 720 and configured to render the page unique across all levels of a dense tree (region), across all regions and across all volumes in the volume layer.

Figure 14:
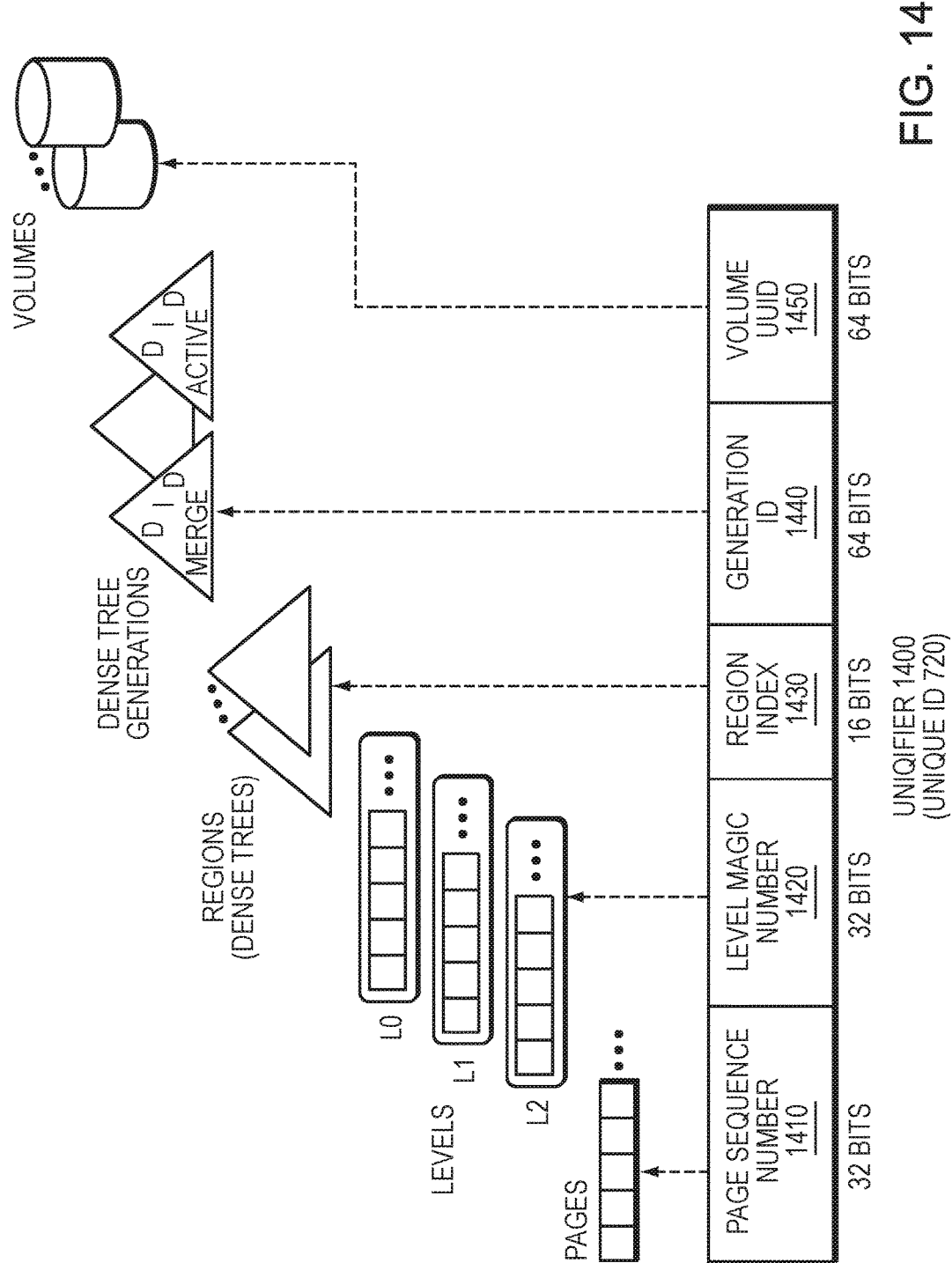
FIG. 14 is a block diagram of a metadata page uniqueifier.

FIG. 14 is a block diagram of a metadata page uniqueifier (i.e., unique value). A first component of the uniqueifier 1400, i.e., a page sequence number 1410, renders the page unique within level 0 (or within any level) of a dense tree (region), whereas a second component of the uniqueifier, i.e., a level magic number 1420, renders the page unique among/across levels of the dense tree (region). A third component of the uniqueifier, i.e., a region index (number) 1430, renders the page unique among/across dense trees or regions of a volume, and a fourth component of the uniqueifier, i.e., a universally unique identifier (UUID) 1450 of each volume, renders the page unique among/across volumes. A fifth component of the uniqueifier, i.e., a generation number 1440, ensures uniqueness between metadata pages in the merge dense tree and those in the active dense tree, i.e., versions (generations) of the dense tree. In an embodiment, the uniqueifier is a five-tuple value, wherein the first tuple (page sequence number) is 32 bits; the second tuple (level magic number) is 32 bits; the third tuple (region number) is 16 bits; the fourth tuple (volume UUID) is 64 bits and the fifth tuple (generation number) is 64 bits in length. An exemplary embodiment of a uniqueifier is described in commonly-owned U.S. patent application Ser. No. 14/483,012, titled Low-Overhead Restartable Merge Operation With Efficient Crash Recovery, by D'Sa et al., filed on Sep. 10, 2014, and published as U.S. Pre-Grant publication 2016/0070714 on Mar. 10, 2016.

The snapshot/clone may be created by sharing the "unique" metadata pages 720 of the parent dense tree with the snapshot/clone through the use of reference counting of the pages at the extent store layer 350 of the storage I/O stack 300. Illustratively, such reference counting (sharing) may occur by incrementing the refcount 1330 on all shared metadata pages via the mkref operations inserted into the refcount log 1310 for the metadata page keys (extent keys 618) of the pages. Similarly, when deleting a LUN (e.g., snapshot/clone), shared metadata pages may be un-referenced (i.e., refcount 1330 decremented) via unref operations inserted into the refcount log. Notably, reference counting (increment or decrement) may occur in a deferred manner and not in-line with the COW operation, i.e., the refcount log 1310 is processed as a background operation and, thus, does not consume latency within the COW operation. Lower levels of the parent dense tree residing on SSDs may also be similarly shared between the parent volume and snapshot/clone. Changes to the parent or snapshot/clone propagate from the in-core portion of the dense tree to the lower levels by periodic merger with the in-core portion such that new "merged" versions of the lower levels are written to the storage devices. Note that changes may also propagate between the lower levels (e.g., between level 1 and level 2) on the storage devices. Note further that extents keys associated with data entries of the shared metadata pages may also be reference counted (e.g., incremented for snapshot/clone create and decremented for snapshot/clone delete) in the above-described manner.

Over time, levels of the parent volume may split or diverge from the levels of the snapshot/clone as a result of new I/O operations, such as write requests, that modify metadata pages of the levels to accommodate new data. For example, divergence as a result of modification to a metadata page, e.g., the level 0 array, of the parent volume may illustratively involve creation of a new metadata page associated with a write request. Note that processing (e.g., storing) of the metadata pages resulting from such divergence or split may occur as a background (e.g., deferred) operation to processing of the write requests. Creation of the new metadata page for the parent volume may, in turn, result in an unref operation directed to an old metadata page shared with the snapshot/clone and a put operation directed to the new metadata page. In addition, such divergence may lead to creation of a new level header, e.g., a new level 0 header 730, for the parent volume. Since all metadata pages, including headers, are rendered "unique", the new level header may be rendered unique by, e.g., modifying the content of the header.

The uniqueifier 1400 may be further used to modify the content of the level header and, thus, generate a unique header for the level of the dense tree during the COW operation. Illustratively, the new level header may be rendered unique by including the uniqueifier 1400 in the header and altering a portion, e.g., incrementing the generation ID 1440, of the uniqueifier. In an embodiment, the generation ID is incremented because some components of the uniqueifier are immutable within the volume (e.g., the region index 1430 and level magic number 1420) and at least one other component may be immutable (e.g., the volume UUID 1450), while yet another component may not be applicable (e.g., the page sequence number 1410 for metadata pages within a level). Moreover, the volume UUID 1450 included in the uniqueifier of the new level header in the diverging parent volume may be the same as that of the uniqueifier of the old level header in the snapshot/clone. Thus, to render the header (and metadata pages) unique, the generation ID 1440 is incremented. In an alternative embodiment, the volume UUID may be modified (e.g., incremented) in lieu of the generation ID. In such an embodiment, the volume UUID of the old level header is updated to reflect the modified UUID of the new level header. Each time the parent dense tree diverges, the snapshot/clone that does not change is assigned the old level header with an un-incremented generation ID of the uniqueifier and the parent volume that does change (e.g., as result of a write request) is assigned the new level header with an incremented generation ID of the uniqueifier.

Shared Dense Tree Repair

The embodiments described herein are directed to a consistency checker configured to perform repairs to one or more multi-level dense trees shared between volumes managed by the volume layer of the storage I/O stack. Illustratively, the volumes include a parent volume and a snapshot and/or clone respectively embodied as a read-only copy (snapshot) or read-write copy (clone) of the parent volume, wherein the snapshot/clone may be represented as an independent volume. Volume metadata managed by the volume layer, i.e., parent volume metadata as well as snapshot/clone metadata, is illustratively organized as the multi-level dense trees according to address space regions, wherein each level of each dense tree dense tree includes volume metadata entries for storing the metadata. The snapshot/clone may be derived from a dense tree of the parent volume (parent dense tree) by sharing portions (e.g., level or volume metadata entries) of the parent dense tree with a dense tree of the snapshot/clone (snapshot/clone dense tree). As used herein, volumes that share dense trees (or portions thereof) are members of a volume family.

In an embodiment, the consistency checker is invoked in response to a failure of a node in the cluster. For example, assume a crash recovery or power failure scenario wherein the node crashes (fails) while I/O requests are pending. The resulting on-disk structures of the volume layer, e.g., the shared dense tree, may be inconsistent because, e.g., there may be corruptions (i.e., errors) that occur during writing, reading, storage, transmission, or processing, which introduce unintended changes on-disk. The consistency checker may thus be invoked to verify and/or fix (i.e., repair) the shared dense tree of the volume layer according to a distributed repair procedure that maintains consistency properties across volumes of the volume family while avoiding repeat of those repairs (cyclic repairs) to the shared dense trees among volumes sharing those dense tree. Verification and repairs are illustratively performed by a daemon of the consistency checker, which daemon contains computer executable instructions executed by the CPU 210 to perform check and repair operations that implement the distributed repair procedure for each level of dense tree.

To that end, the distributed repair procedure of the consistency checker is configured to operate in parallel (i.e., concurrently) on the dense trees shared among multiple volumes to check and repair the dense trees using a lock-free workflow, wherein the use of locks is minimized when traversing (i.e., walking) the dense trees. As noted previously, the metadata managed by the volume layer, i.e., the volume metadata, is illustratively embodied as mappings from offset ranges of a LUN to extent keys. The LUN may be apportioned into multiple volumes, each of which may be partitioned into multiple regions (e.g., allotted as disjoint offset ranges), wherein each region is represented by a dense tree. Operations on the volume metadata managed by the volume layer illustratively manifest as modifications to metadata entries of the dense trees at offset ranges of the regions. Moreover, the operations directed to the regions are illustratively processed by services, e.g., threads of execution on CPUs of the nodes. The distributed repair procedure described herein increases concurrency of operation execution (i.e., modifications to the metadata entries at various offset ranges), while reducing contention among the resources (e.g., CPUs) by distributing the operations among the regions and mapping each region to a service, thereby enabling use of parallelism for different volume families and across different regions. Accordingly, the repair and check operations on the volume metadata of the regions may execute in parallel because those operations are configured to utilize the services without any dependency on operations executing on other regions. That is, there is no dependency between operations executing on the metadata of different regions for the volumes. However, for each (same) region of volumes for a family, the operations performed on those volumes are serialized.

Figure 15:
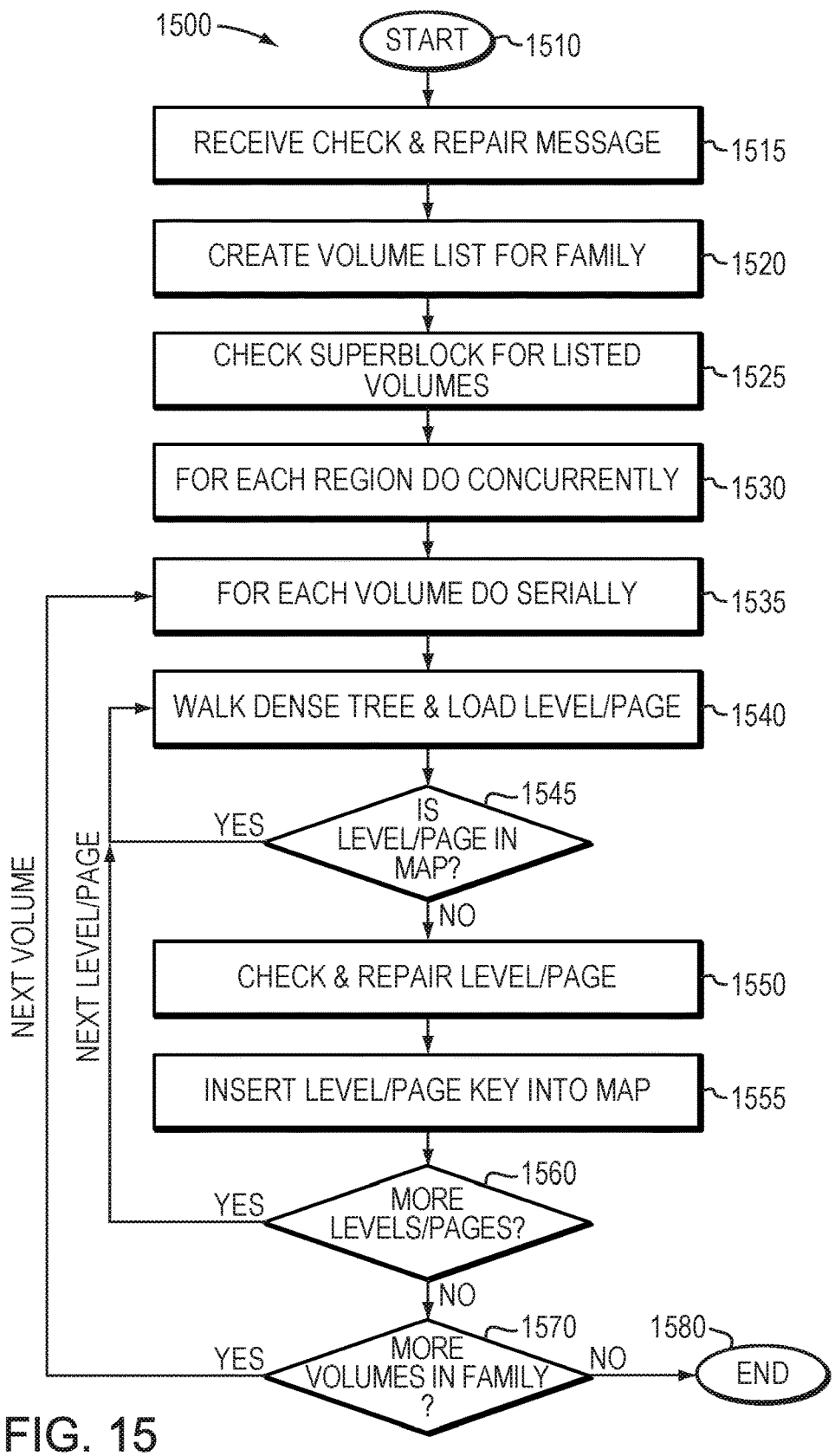
FIG. 15 is a flowchart of a distributed repair procedure of a consistency checker for dense trees shared among the parent volume and snapshot/clone.

Illustratively, the distributed repair procedure commences at startup by, e.g., a volume layer process (startup code), which forwards a plurality of check and repair messages in parallel across the regions of the volume family to initiate execution of the consistency checker. FIG. 15 is a flowchart of the distributed repair procedure for the consistency checker for dense trees shared among the parent volume and snapshot/clone. The repair procedure 1500 starts at step 1510 and proceeds to step 1515 where the consistency checker (i.e., daemon) receives the check and repair message. At step 1520, the consistency checker creates a list of the volumes (parent, snapshot and/or clone) for each family and, at step 1525, loads and checks the superblock for each volume (i.e., volume superblock 760), which superblock contains region keys to the roots of the dense trees for all regions of the volume. At step 1530, the consistency checker initiates checking concurrently by region for each volume of the respective family in serial fashion (step 1535). At steps 1540 through 1560, the consistency checker walks each dense tree per region verifying levels and pages (as described herein) and, upon discovering a corruption (i.e., error), repairs the tree (e.g., levels and pages) such that each repair is made once, i.e., a non-cyclic repair. In an embodiment, the consistency checker is configured to make repairs to the shared dense tree only once (i.e., non-cyclic repairs), even though the checker may attempt to traverse (walk) the dense tree multiple times for multiple volumes of the family. That is, the distributed repair procedure of the consistency checker is further configured to render non-cyclic repairs to each dense tree that ensure that the repairs are rendered once to avoid traversing the dense tree multiple times for the volumes of the volume family.

In an embodiment, each level header includes a header key (e.g., header key 732 of the L0 header 730) to a corresponding level header of the dense tree. Illustratively, the consistency checker maintains a per volume family, per region map in the memory, i.e., an in-core map 1590a-n, organized as a key-value data structure (not shown), wherein the key is the header key for a header block representing a level of the dense tree and the value is a reference counter (e.g., reference counter 734, 744, 754) maintained for the level. The in-core map 1590 is configured to indicate which header keys have been used to traverse and verify the levels/pages of the dense tree. The consistency checker uses the map to traverse the shared dense tree as an acyclic graph (i.e., prevent re-traversing any level of the shared dense tree), so as to avoid making repairs more than once. Illustratively, the consistency checker uses the map to mark levels/pages of the dense tree (represented by the header key) as they are traversed and checked/repaired, so as to avoid cyclic paths and, thus, cyclic repairs. While walking the dense tree at step 1540, the consistency checker examines the map to determine the presence of a header key (step 1545) corresponding to a current level/page of the dense tree being traversed. If the header(level)/page key is not present in the map 1590, the consistency checker inserts the header (level)/page key with an associated reference count of "1" into the map at step 1555, loads the header/page (e.g., from SSD to memory), checks (verifies) the header/pages of the level as well as fixes (repairs) any detected corruption, if necessary, at step 1550. If there are more levels/pages to check and repair (step 1560), the procedure returns to step 1540 where the consistency checker proceeds to load a next level/page. The procedure then continues to step 1570, where a determination is made as to whether there are more volumes in the family to check and repair. If so, the procedure returns to step 1535; otherwise, the procedure ends at step 1580.

In an embodiment, the consistency checker traverses and checks the dense tree in a post-order depth first traversal (e.g., starting at L2 and proceeding to L0). As will be understood to persons of skill in the art, other bottom-up traversal methods may be used. However, the level headers may be loaded and checked top-down before traversing the dense tree bottom-up as a whole. If the header key for a level is present in the map, the consistency checker does not check that level of the dense tree as it has already been checked by virtue of its presence in the map. Illustratively, each entry of the map includes the header key representing whether a level of the dense tree associated with that header key is marked or not (as it is checked and repaired) and if that key is accessed again (e.g., in the context of traversing a dense tree shared with a child volume), the level is not checked (verified) and repaired again (i.e., it is skipped), because it was previously checked and repaired.

In an embodiment, the map may include entries corresponding to the pages of L0 that have been traversed and checked/repaired. Since the lower levels, e.g., L1 and L2, are dense tree levels (e.g., sorted and packed metadata entries), the map need only have entries corresponding to headers that represent those levels as a whole rather than individual pages of L1 and L2. For example, assume a level header and level/pages of the shared dense tree have been fixed in the context of a parent volume. If the header key is present in the map when checking the shared dense tree in the context of a child volume, e.g., a snapshot, the consistency checker need not check that level again as it has already been checked (and fixed) by virtue of the presence of the header key in the map. That is, the consistency checker may skip checking the shared level of dense tree in the child volume context. Marking of entries of the map thus enables the consistency checker to avoid cyclic repairs (i.e., performing a same repair by traversing duplicate paths in the shared dense tree while seeking to perform a repair but, instead, needlessly repeating that same repair). Note that each map entry for a header key may include the associated reference count that is incremented when accessing a level header having an associated header key that is already in the map.

In another embodiment, the repair procedure also performs reference count validation and repair. Illustratively, each level header of the dense tree holds a reference counter (refcount) indicating a number of references to the dense tree level, i.e., the refcount tracks sharing of the dense tree level among the family members (volumes). If the refcount in the level header is corrupted, the consistency checker may invoke a refcount validation and repair algorithm to gather an actual number of references (pointers) to the header and determine whether that actual number matches the refcount recorded in the header. If not, the refcount of the header is repaired to reflect the actual number.

For example, assume there are three actual references to a level header, but the refcount recorded in the level header indicates a corrupted value (e.g., 0 or 100). During execution of the consistency checker, all volumes (parent, snapshots/clones) are traversed to gather the references (pointers) and any corrupted refcounts are repaired (fixed) to reflect the actual number of pointers to the level headers. That is, the actual number of references (pointers) to the header is gathered and, if the actual number does not match the refcount recorded in the header, the refcount is repaired to reflect that actual number. In the event it is discovered that one or more of the gathered pointers (references) is corrupted, the corrupted pointer is discarded and is not reflected (disregarded) in the actual number of references used to repair the refcount.

In yet another embodiment the repair procedure, generation number repair is performed. As noted, the generation number of the uniqueifier may be used to uniquely identify a level header of the dense tree or a metadata page within a volume family. Illustratively, the generation number is a monotonically increasing value. When checking the level header, the consistency checker may invoke a generation number repair algorithm to determine whether the generation number is corrupted and, if so, calculate a generation number that does not collide with other dense tree generation numbers in the volume family. The generation number repair algorithm further ensures that the parent volume (i.e., topmost volume of the volume family) has a greatest generation number of the volume family, because it (the parent volume) receives newer active I/O operations (metadata) as opposed to snapshots that retain older, fixed metadata.

According to the repair procedure, the consistency checker walks (e.g., traverses in post-order depth first) the dense tree and gathers the generation numbers of metadata pages across all levels of the dense tree for the parent, snapshots and clones of the volume family. Thereafter a generation number "check phase" may be performed, wherein the consistency checker repairs any corrupted generation number to reflect a maximum generation number that was gathered (i.e., the maximum across all levels for the parent, snapshots and clones) plus 1 ("max gen ID+1"). A corrupted generation number may reflect a value that is either improper (e.g., 0) or that violates one or more of the following generation number properties: (i) the generation number of L0 is always greater than the generation number of L1 (i.e., gen num L0>gen num L1); and (ii) the generation number of L1 is always greater than the generation number of L2 (i.e., gen num L1>gen num L2). Illustratively, the consistency checker repairs the corrupted generation number starting at a lowest level of the dense tree. For example, if the corruption occurs at L2, the generation number is repaired by recording the "max gen ID+1" in all metadata pages of L2 as well as the level header of L2. To also satisfy the generation number property (ii), the metadata pages and header of L1 are repaired to reflect "(max gen ID+1)+1" so that L1 is greater than L2.

Note that if corruption is discovered in a child volume (e.g., a snapshot), a repair to the snapshot may impact any repair to the parent volume even if the parent volume is not corrupted. That is, the max gen ID repair propagates last to the parent volume such that the parent volume is always repaired after the snapshot is repaired and in a manner where the parent volume (i.e., topmost volume of the volume family) has the highest generation number in the volume family. For example, if the metadata pages and levels of the parent volume were repaired prior to the snapshot being repaired according to max gen ID value (i.e., the snapshot has the higher generation number), the generation number of the parent volume may increase to equal (i.e., catch-up to) the snapshot generation number through active I/O operations and future merges, which may cause further corruption when the generation numbers match of the snapshot and parent. In an embodiment, non-corrupted child volumes need not incur repair to their respective gen ID value; however the gen ID value of the topmost volume (i.e., parent volume) is repaired regardless of whether any child volumes have been repaired.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software encoded on a tangible (non-transitory) computer-readable medium (e.g., disks, electronic memory, and/or CDs) having program instructions executing on a computer, hardware, firmware, or a combination thereof. Accordingly this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A method comprising:
    initiating a consistency checker to perform repairs to levels of dense trees shared among volumes of a volume family managed by a volume layer of a storage input/output (I/O) stack executing on a node, each level of each dense tree including volume metadata entries for storing metadata, the volume metadata entries organized as metadata pages according to address space regions for the volumes, each region represented by a dense tree; and
    configuring the consistency checker to operate in parallel on the dense trees shared among the volumes to check and repair the dense trees using a workflow that minimizes use of locks when traversing the dense trees, the consistency checker further configured to render non-cyclic repairs to each dense tree that ensure that the repairs are rendered once to avoid traversing the respective dense tree multiple times for the volumes of the volume family.

2. The method of claim 1 wherein configuring the consistency checker further comprises:
    maintaining a map in a memory of the node, the map organized as a key-value data structure wherein the key is a header key included in a level header of each level of the dense tree and the value is a reference counter maintained for the level of the dense tree; and
    marking the map to indicate use of the header key to check and repair the level and the metadata pages of the level to avoid cyclic repairs to the dense tree.

3. The method of claim 1 wherein configuring the consistency checker further comprises:
    processing check and repair operations directed to the volume metadata of the regions using a plurality of services;
    distributing the check and repair operations among the regions;
    mapping each region to a service; and
    executing the check and repair operations on the volume metadata of the regions in parallel across the regions.

4. The method of claim 3 wherein the services are threads of execution on processors of the node.

5. The method of claim 1 further comprising:
    using a generation number within a level header of each level of the dense tree to uniquely identify the level header within the volume family;
    determining whether the generation number is corrupted; and, if the generation number is corrupted, assigning a new generation number to the level header that does not collide with other generation numbers in the volume family.

6. The method of claim 5 wherein the volumes of the volume family include a parent volume and one of a snapshot volume and a clone volume.

7. The method of claim 6 further comprising:
ensuring that the level header of the parent volume has a greatest generation number of the volume family.

8. The method of claim 1 further comprising:
recording a reference count within a level header of each level of the dense tree to track sharing of the levels between the volumes, the reference count indicating a number of pointers to a corresponding level of the dense tree;
gathering an actual number of the pointers to the level header;
determining whether the actual number matches the reference count recorded in the level header; and
in response to the actual number not matching the recorded reference count, repairing the reference count to reflect the actual number.

9. The method of claim 8 wherein gathering the actual number comprises:
discovering that one of the pointers is corrupted;
discarding the corrupted pointer; and
disregarding the corrupted pointer in the actual number used to repair the reference count.

10. A system comprising:
a central processing unit (CPU) of a node coupled to one or more storage devices; and
a memory coupled to the CPU and configured to store a storage input/output (I/O) stack executable by the CPU, the storage I/O stack having a volume layer configured to manage metadata of dense trees having multiple levels shared among volumes of a volume family, each level of each dense tree including volume metadata entries for storing the metadata, the volume metadata entries organized as metadata pages according to address space regions for the volumes, each region represented by a dense tree, the storage I/O stack configured to:
initiate a consistency checker to perform repairs to the levels of the dense trees shared among the volumes; and
configure the consistency checker to operate in parallel on the dense trees shared among the volumes to check and repair the dense trees in a manner that minimizes use of locks when traversing the dense trees, the consistency checker further configured to render non-cyclic repairs to each dense tree that ensure that the repairs are rendered once to avoid traversing the dense tree multiple times for the volumes of the volume family.

11. The system of claim 10 wherein the storage I/O stack is further configured to:
maintain a map in a memory of the node, the map organized as a key-value data structure wherein the key is a header key included in a level header of each level of the dense tree and the value is a reference counter maintained for the level of the dense tree; and
mark the map to indicate use of the header key to check and repair the level and the metadata pages of the level to avoid cyclic repairs to the dense tree.

12. The system of claim 10 wherein the storage I/O stack is further configured to:
process check and repair operations directed to the volume metadata of the regions using a plurality of services;
distribute the check and repair operations among the regions;
map each region to a service; and
execute the check and repair operations on the volume metadata of the regions in parallel across the regions.

13. The system of claim 12 wherein the services are threads of execution on processors of the node.

14. The system of claim 10 wherein the storage I/O stack is further configured to:
use a generation number within a level header of each level of the dense tree to uniquely identify the level header within the volume family;
determine whether the generation number is corrupted; and,
if the generation number is corrupted, assign a new generation number to the level header that does not collide with other generation numbers in the volume family.

15. The system of claim 14 wherein the volumes of the volume family include a parent volume and one of a snapshot volume and a clone volume.

16. The system of claim 15 wherein the storage I/O stack is further configured to:
ensure that the level header of the parent volume has a greatest generation number of the volume family.

17. The system of claim 10 wherein the storage I/O stack is further configured to:
record a reference count within a level header of each level of the dense tree to track sharing of the levels between the volumes, the reference count indicating a number of pointers to a corresponding level of the dense tree;
gather an actual number of the pointers to the level header;
determine whether the actual number matches the reference count recorded in the level header; and
in response to the actual number not matching the recorded reference count, repair the reference count to reflect the actual number.

18. The system of claim 17 wherein the storage I/O stack configured to gather the actual number is further configured to:
discover that one of the pointers is corrupted;
discard the corrupted pointer; and
disregard the corrupted pointer in the actual number used to repair the reference count.

19. A non-transitory computer readable medium including program instructions for execution on one or more processors, the program instructions configured to:
initiate a consistency checker to perform repairs to levels of dense trees shared among volumes of a volume family managed by a volume layer of a storage input/output (I/O) stack executing on a node, each level of each dense tree including volume metadata entries for storing metadata, the volume metadata entries organized as metadata pages according to address space regions for the volumes, each region represented by a dense tree; and
configure the consistency checker to operate in parallel on the dense trees shared among the volumes to check and repair the dense trees in a manner that minimizes use of locks when traversing the dense trees, the consistency checker further configured to render non-cyclic repairs to each dense tree that ensure that the repairs are rendered once to avoid traversing the respective dense tree multiple times for the volumes of the volume family.

20. The non-transitory computer readable medium of claim 19 wherein the program instructions are further configured to:
process check and repair operations directed to the volume metadata of the regions using a plurality of services;
distribute the check and repair operations among the regions;
map each region to a service; and
execute the check and repair operations on the volume metadata of the regions in parallel across the regions.

* * * * *